(12) United States Patent
Okuda et al.

(10) Patent No.: US 8,351,722 B2
(45) Date of Patent: Jan. 8, 2013

(54) ENCODER, DECODER, ENCODING METHOD AND DECODING METHOD, AND RECORDING MEDIUM

(75) Inventors: Masakazu Okuda, Kanagawa (JP); Ryuji Kaneko, Tokyo (JP); Yuji Wada, Tokyo (JP)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 12/645,693

(22) Filed: Dec. 23, 2009

(65) Prior Publication Data

US 2010/0166052 A1   Jul. 1, 2010

(30) Foreign Application Priority Data

Dec. 25, 2008  (JP) .................................. 2008-330208

(51) Int. Cl.
    *G06K 9/36* (2006.01)
(52) U.S. Cl. .................................. 382/246; 375/240.23
(58) Field of Classification Search .......... 382/232–250; 375/240.23
    See application file for complete search history.

(56) References Cited

U.S. PATENT DOCUMENTS

| 5,414,468 | A | * | 5/1995 | Lee ........................... 375/240.16 |
| 5,557,332 | A | * | 9/1996 | Koyanagi et al. ........ 375/240.16 |
| 6,870,883 | B2 | * | 3/2005 | Iwata ........................ 375/240.01 |
| 2002/0031184 | A1 | * | 3/2002 | Iwata ........................ 375/240.23 |
| 2005/0147174 | A1 | * | 7/2005 | Iwata ........................ 375/240.23 |
| 2006/0233525 | A1 | * | 10/2006 | Shibata et al. ................. 386/95 |
| 2008/0063082 | A1 | * | 3/2008 | Watanabe et al. ........ 375/240.23 |
| 2009/0080531 | A1 | * | 3/2009 | Hashiguchi et al. ..... 375/240.24 |

FOREIGN PATENT DOCUMENTS

JP    2006-319943    11/2006

* cited by examiner

*Primary Examiner* — Jingge Wu

(74) *Attorney, Agent, or Firm* — Wolf, Greenfield & Sacks, P.C.

(57) ABSTRACT

An encoder includes a separation unit separating image data into a plurality of data blocks, a variable length encoding unit variable-length-encoding the data blocks separated by the separation unit so as to generate variable length code sequences, a code block generating unit generating code blocks variable-length-decoded in parallel from a start end and a termination end by combining two variable length code sequences generated by the variable length encoding unit, and a bit stream generating unit generating a bit stream such that a boundary between the code blocks is recognized.

10 Claims, 35 Drawing Sheets

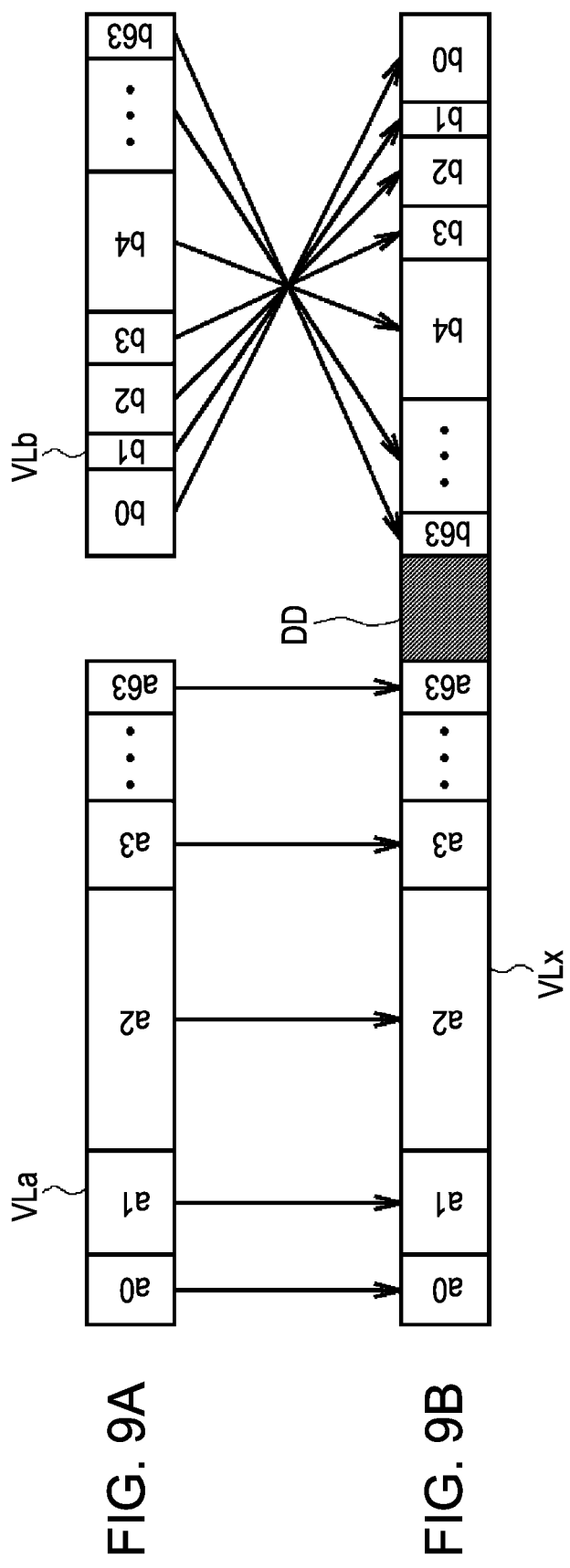
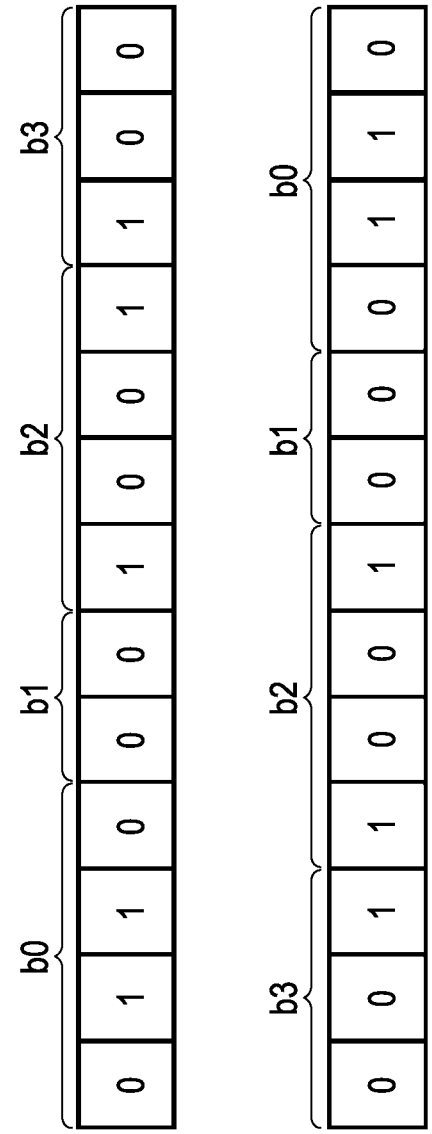
FIG. 9A FIG. 9B FIG. 9C FIG. 9D

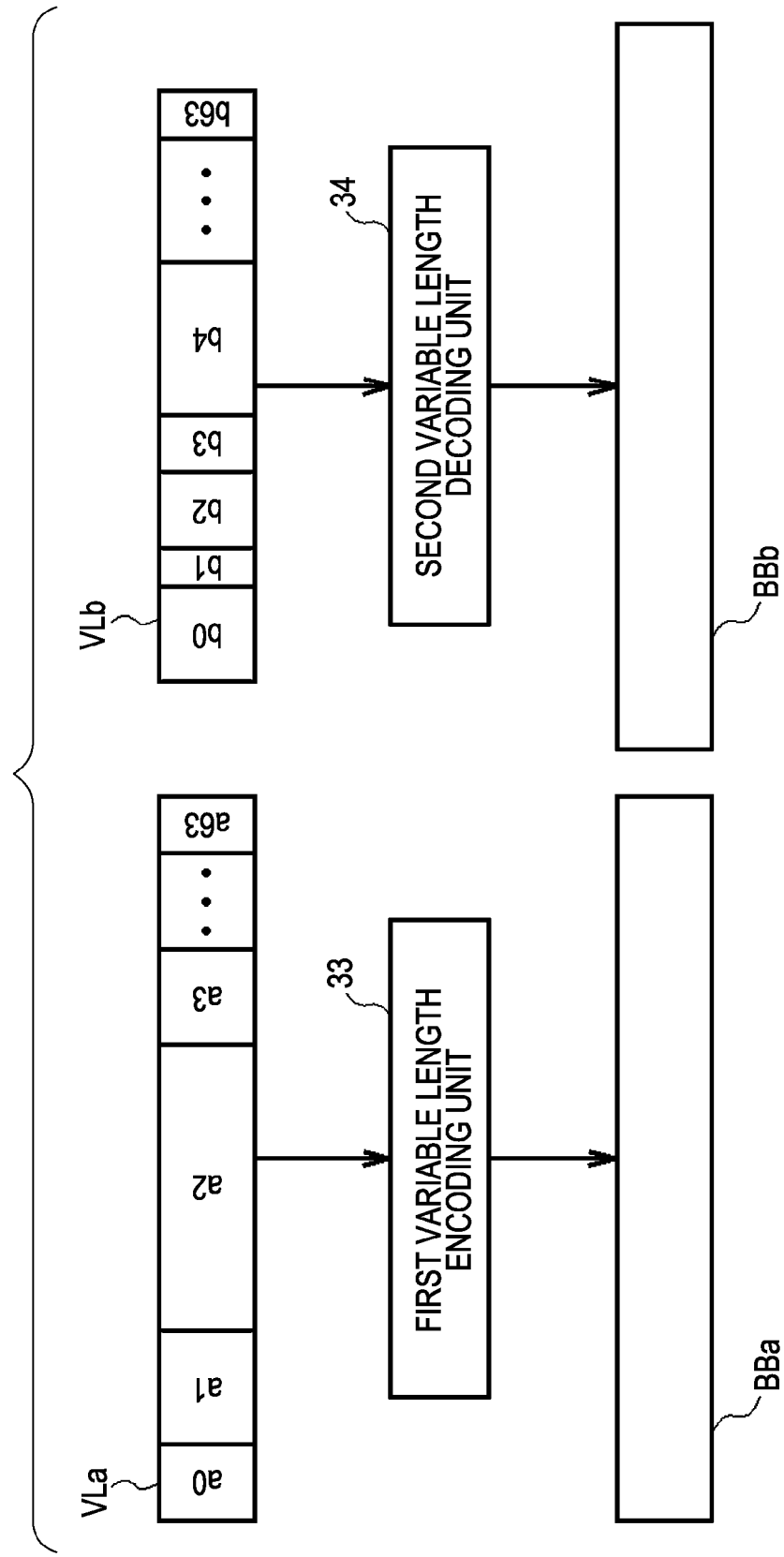

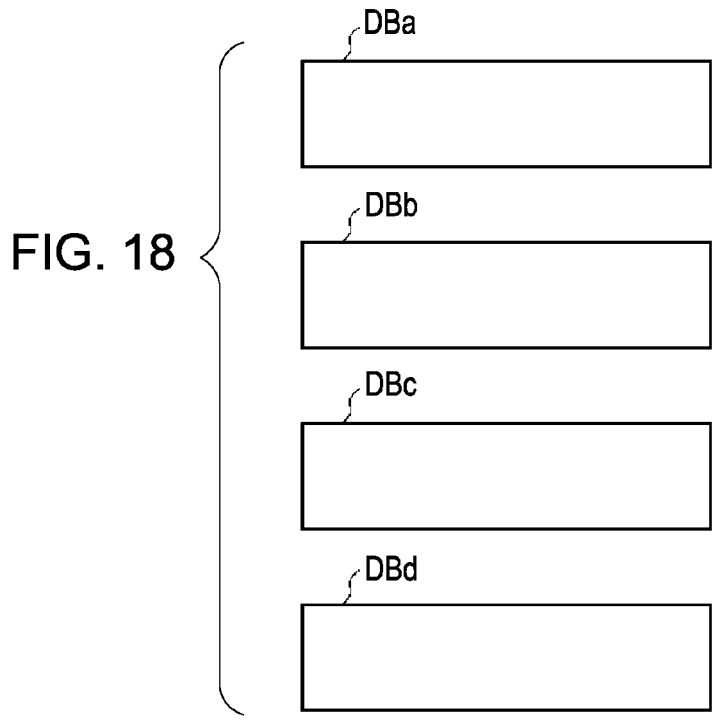
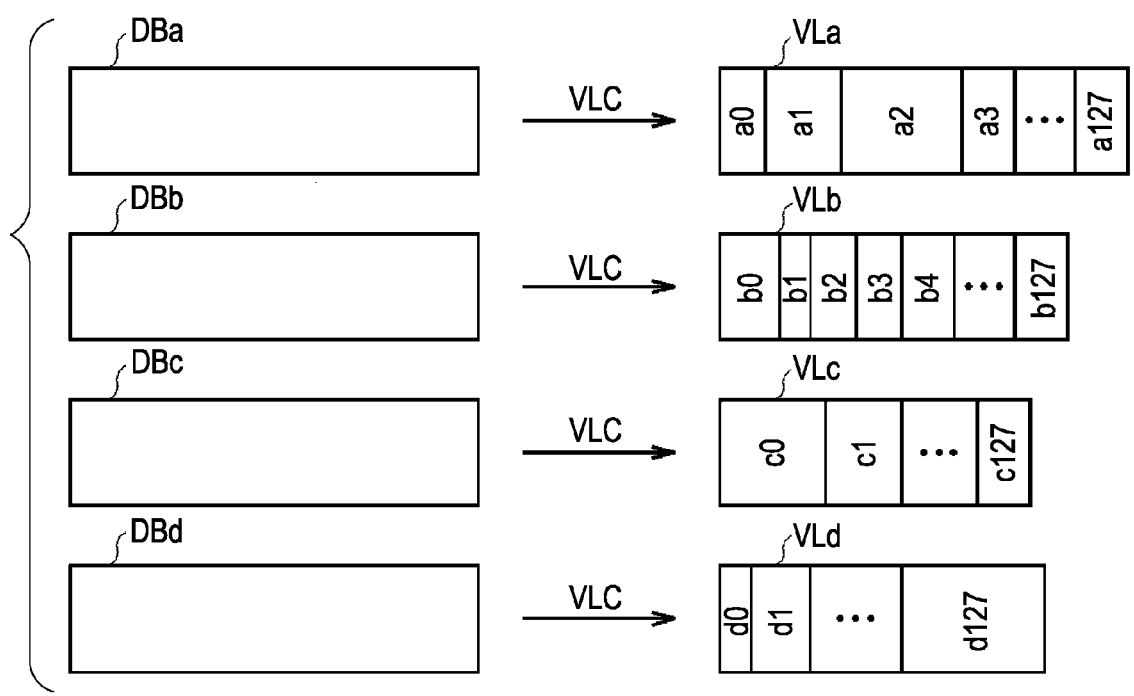

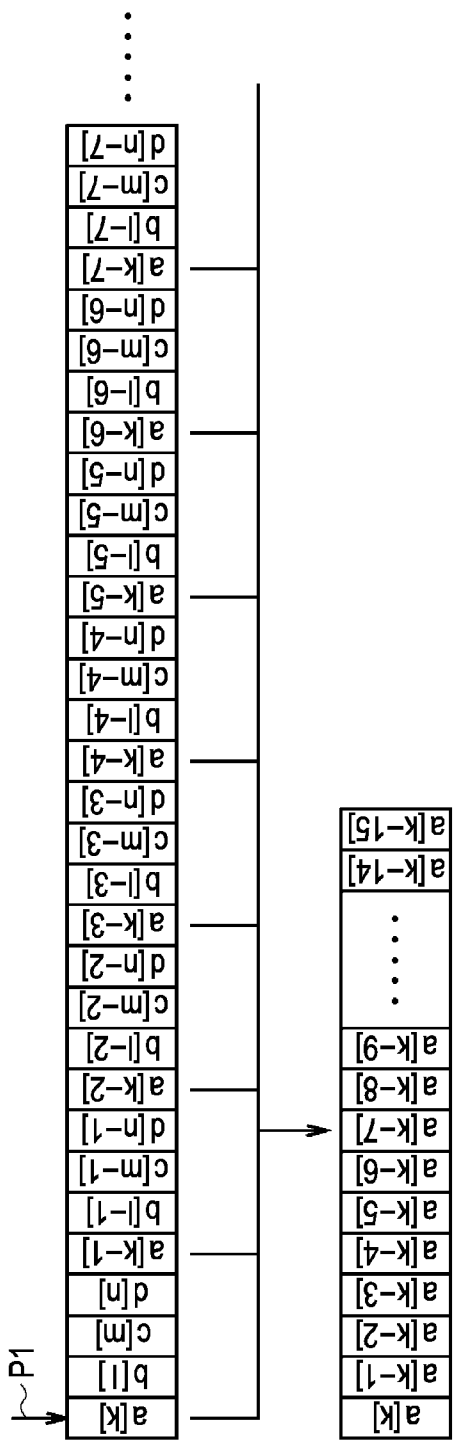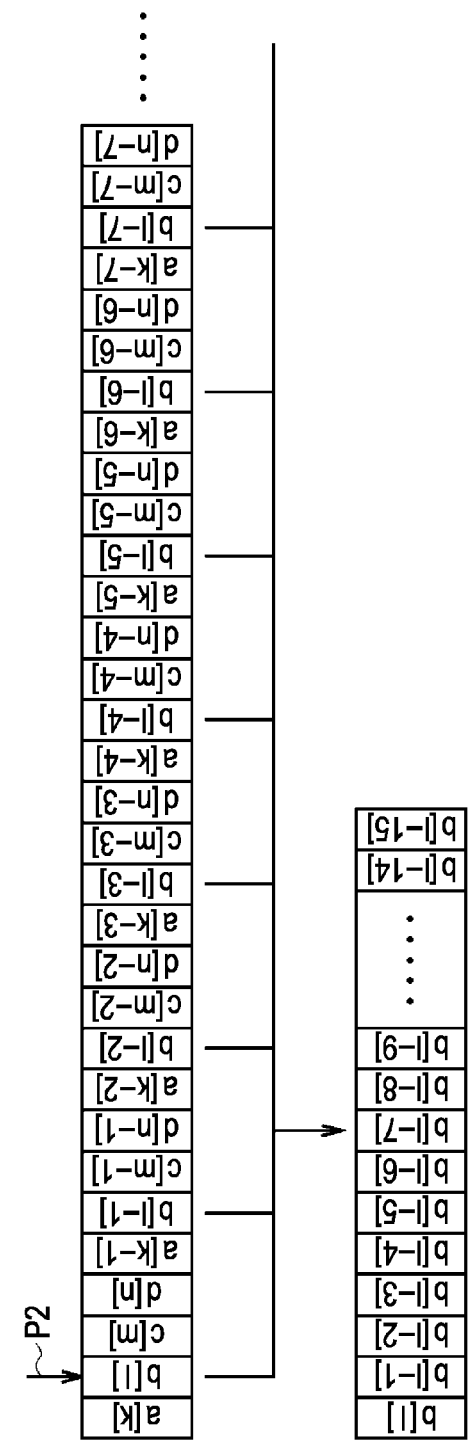
FIG. 23A  FIG. 23B  FIG. 23C  FIG. 23D

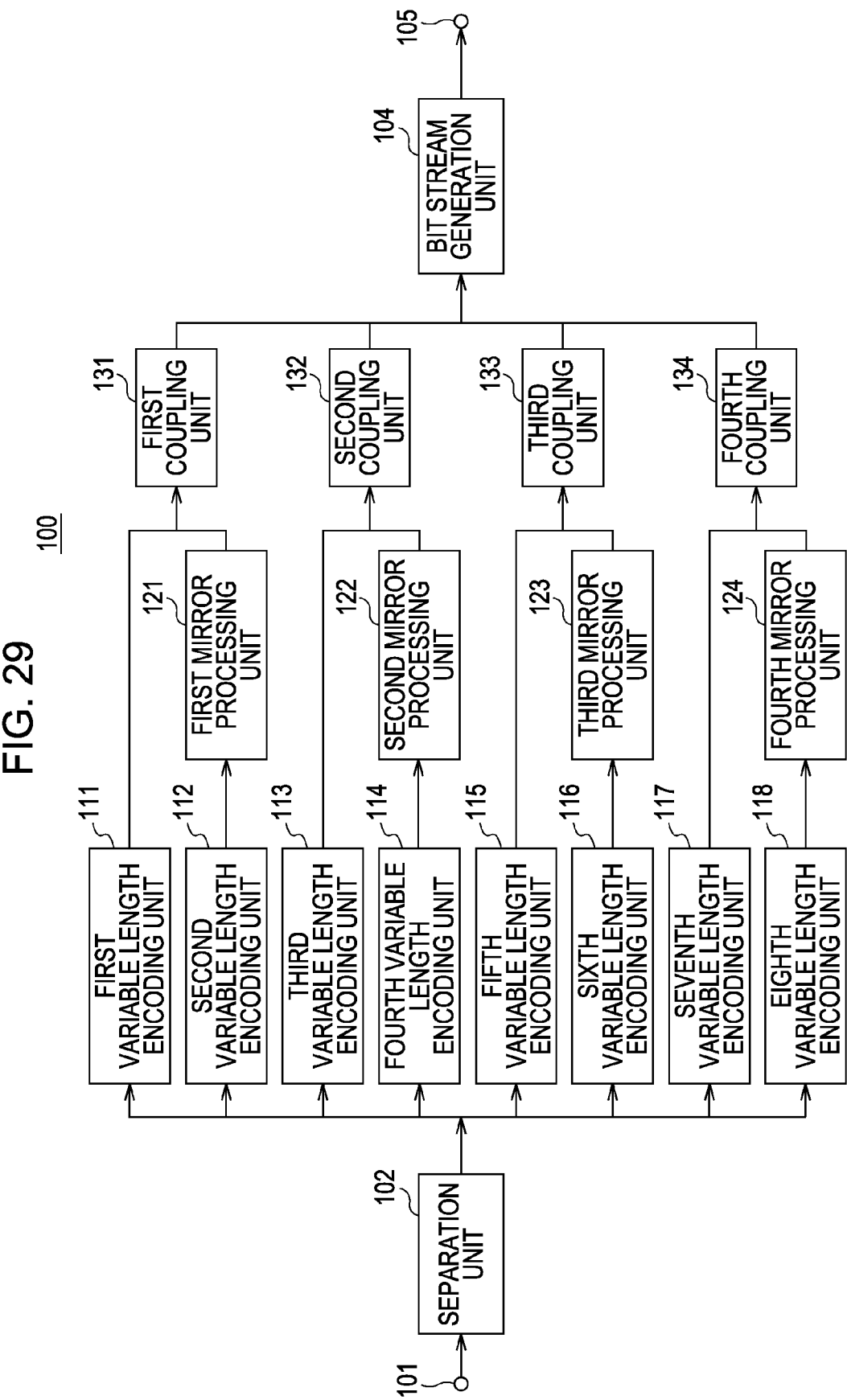

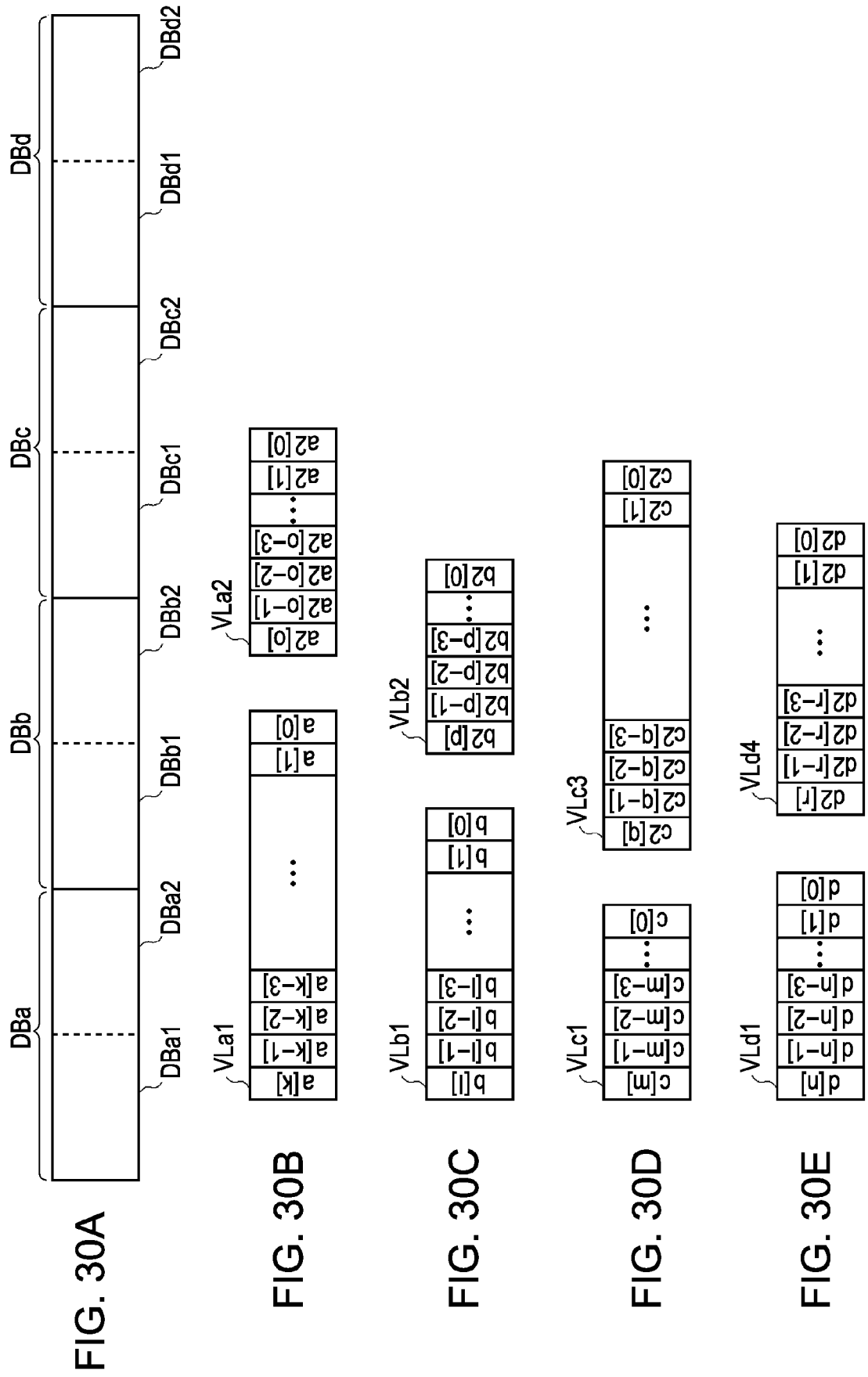

FIG. 31A FIG. 31B FIG. 31C FIG. 31D FIG. 31E

ENCODER, DECODER, ENCODING METHOD AND DECODING METHOD, AND RECORDING MEDIUM

BACKGROUND OF THE INVENTION

1. Field of the Invention

The present invention relates to an encoder for variable-length-encoding image data, an encoding method and a recording medium having an encoding program recorded thereon, a decoder for variable-length-decoding variable-length-encoded data, and a decoding method and a recording medium having a decoding program recorded thereon, which are suitably applied to a decoder and an encoder used for various encoding systems.

2. Description of the Related Art

In the related art, generally, image data is encoded by an encoder so as to be recorded or distributed and is decoded by a decoder when an image is displayed. Recently, information amount of image data is increased with high accuracy of an image and thus encoded image data (hereinafter, referred to as a bit stream) is decoded at a high speed.

Therefore, technology of separating a bit stream into slices and simultaneously decoding a plurality of slices by the plurality of decoders arranged in parallel is suggested (for example, see Japanese Unexamined Patent Application Publication No. 2006-319943).

SUMMARY OF THE INVENTION

FIG. 1 shows the configuration of variable-length-encoded image data (hereinafter, referred to as a variable length code sequence). The variable length code sequence is generated by allocating variable length codes having different lengths allocated in response to a difference in appearance frequency from image data having a fixed length, in a variable length encoding process. As a result, the information amount of the variable length code sequence can further be decreased than that of image data on the whole.

As shown in FIG. 2, a bit stream composed of variable length code sequences VL1, VL2, . . . is generated by sequentially variable length encoding data blocks DB1, DB2, . . . input as image data.

As shown in FIG. 3A, in a variable length decoding process of decoding the variable length code sequence, bits having a maximum code length or more from the leading bit of the bit stream are read. Hereinafter, the read bits are referred to as bits to be decoded. A previously stored Variable Length Decoding (VLD) table and the bits to be decoded having the maximum code length or more are collated and a fixed length code coinciding with the bits to be decoded is selected as decoded data.

As shown in FIG. 3B, next bits of the bits used for decoding in the variable length code sequence are set to bits to be decoded, and the bits to be decoded are similarly variable-length-decoded so as to generate decoded data. By coupling the decoded data, image data is generated.

Similar to the above-described decoder, even in the variable length decoding process of decoding the variable length code sequence, a plurality of variable length decoding units is provided in parallel so as simultaneously to generate decoded data, thereby accelerating the variable length decoding process.

However, as shown in FIG. 1, the variable length codes have variable lengths, and it may not be confirmed by which bits the variable length codes are represented.

For example, as shown in FIG. 4, the case where two variable length decoding units (a first variable length decoding unit 1 and a second variable length decoding unit 2) will be described. The first variable length decoding unit 1 reads bits to be decoded from the leading bit of the bit stream and generates decoded data composed of fixed length codes by referring to the VLD table. At this time, the code length allocated to a leading variable length code is first identified and thus the lead of the next variable length code is recognized.

That is, the second variable length decoding unit 2 may not recognize the lead of the next variable length code and may not generate the decoded data together with the first variable length decoding unit 1.

In the variable length decoding process of the related art, a parallel process using a plurality of variable length decoding units is not performed and a variable length decoding process is hard to be performed at a high speed.

It is desirable to provide an encoder, an encoding method and a recording medium having an encoding program recorded thereon, a decoder, a decoding method and a recording medium having a decoding program recorded thereon, which are capable of performing a variable length decoding process at a high speed.

According to an embodiment of the present invention, there is provided an encoder including: a separation unit separating image data into a plurality of data blocks; a variable length encoding unit variable-length-encoding the data blocks separated by the separation unit so as to generate variable length code sequences; a code block generating unit generating code blocks variable-length-decoded in parallel from a start end and a termination end by combining two variable length code sequences generated by the variable length encoding unit; and a bit stream generating unit generating a bit stream such that a boundary between the code blocks is recognized.

To this end, in an encoder according to an embodiment of the present invention, since two start positions where variable length decoding is started can be specified by the boundary between the code blocks of the bit stream, it is possible to execute a variable length decoding process in parallel from the two start position, when the variable length decoding process is performed.

According to another embodiment of the present invention, there is provided a decoder including: a receiving unit including a plurality of code blocks having variable length codes and receiving a generated bit stream such that a boundary between the code blocks is recognized; a specifying unit specifying a start end and a termination end of the code blocks based on the boundary between the code blocks; and a parallel decoding unit variable-length-decoding the bit stream received by the receiving unit in parallel from the start end and the termination end of the code blocks specified by the specifying unit.

To this end, in a decoder according to an embodiment of the present invention, since two start positions where variable length decoding is started can be specified by the boundary between the code blocks of the bit stream, it is possible to execute a variable length decoding process in parallel from the two start position.

According to another embodiment of the present invention, there is provided an encoding method including the steps of: separating image data into a plurality of data blocks; variable-length-encoding the data blocks so as to generate variable length code sequences; generating code blocks variable-length-decoded in parallel from a start end and a termination end by combining two variable length code sequences generated in the variable-length-encoding step; and generating a bit stream such that a boundary between the code blocks is recognized.

To this end, in an encoding method according to an embodiment of the present invention, since two start positions where variable length decoding is started can be specified by the boundary between the code blocks of the bit stream, it is possible to execute a variable length decoding process in parallel from the two start positions, when the variable length decoding process is performed.

According to another embodiment of the present invention, there is provided a decoding method including the steps of: receiving a generated bit stream such that a boundary between code blocks is recognized, with a plurality of code blocks having variable length codes; specifying a start end and a termination end of the code blocks based on the boundary between the code blocks; and variable-length-decoding the bit stream received in the receiving step in parallel from the start end and the termination end specified by the specifying unit.

To this end, in a decoding method according to an embodiment of the present invention, since two start positions where variable length decoding is started can be specified by the boundary between the code blocks of the bit stream, it is possible to execute a variable length decoding process in parallel from the two start position.

According to another embodiment of the present invention, there is provided a recording medium having an encoding program recorded thereon, which executes a method with respect to a computer, the method including the steps of: separating image data into a plurality of data blocks; variable-length-encoding the data blocks so as to generate variable length code sequences; generating code blocks variable-length-decoded in parallel from a start end and a termination end by combining two variable length code sequences generated in the variable-length-encoding step; and generating a bit stream such that a boundary between the code blocks is recognized.

To this end, in an encoding program recorded on a recording medium according to an embodiment of the present invention, since two start positions where variable length decoding is started can be specified by the boundary between the code blocks of the bit stream, it is possible to execute a variable length decoding process in parallel from the two start positions, when the variable length decoding process is performed.

According to another embodiment of the present invention, there is provided a recording medium having a decoding program recorded thereon, which executes a method with respect to a computer, the method including the steps of: receiving a generated bit stream such that a boundary between code blocks is recognized, with a plurality of code blocks having variable length codes; specifying a start end and a termination end of the code blocks based on the boundary between the code blocks; and variable-length-decoding the bit stream received in the receiving step in parallel from the start end and the termination end specified by the specifying unit.

To this end, in a decoding program recorded on a recording medium according to an embodiment of the present invention, since two start positions where variable length decoding is started can be specified by the boundary between the code blocks of the bit stream, it is possible to execute a variable length decoding process in parallel from the two start positions.

According to the embodiments of the present invention, since two start positions where variable length decoding is started can be specified by the boundary between the code blocks of the bit stream, it is possible to execute a variable length decoding process in parallel from the two start positions. Therefore, according to the embodiments of the present invention, it is possible to realize an encoder, an encoding method and a recording medium having an encoding program recorded thereon, which are capable of performing a variable length decoding process at a high speed.

According to the embodiments of the present invention, since two start positions where variable length decoding is started can be specified by the boundary between the code blocks of the bit stream, it is possible to execute a variable length decoding process in parallel from the two start positions. Therefore, according to the embodiments of the present invention, it is possible to realize a decoder, a decoding method and a recording medium having a decoding program recorded thereon, which are capable of performing a variable length decoding process at a high speed.

BRIEF DESCRIPTION OF THE DRAWINGS

FIG. 9 is a schematic diagrammatic view provided for replacement of data according to the first embodiment of the present invention.

FIG. 12 is a schematic diagrammatic view provided for illustrating variable length decoding process according to the first embodiment of the present invention.

FIG. 18 is a schematic diagrammatic view provided for illustrating separation of data according to the second embodiment of the present invention.

FIG. 19 is a flowchart provided for illustrating variable length decoding according to the second embodiment of the present invention.

FIG. 23 is a schematic diagrammatic view provided for illustrating reading (1) of bits to be decoded according to the second embodiment of the present invention.

FIG. 29 is a schematic diagrammatic view showing the configuration of an encoder according to a third embodiment of the present invention.

FIG. 30 is a schematic diagrammatic view showing the configuration of a variable length code according to the third embodiment of the present invention.

FIG. 31 is a schematic diagrammatic view provided for illustrating generation of a bit stream according to the third embodiment of the present invention.

DESCRIPTION OF THE PREFERRED EMBODIMENTS

Hereinafter, the embodiments of the present invention will be described. The description is made in the following order.

1. First Embodiment (Parallel Process according to Variable Length Decoding from Both Ends)
2. Second Embodiment (Parallel Process by Alternately Storing Plural Pieces of Data)
3. Third Embodiment (Combination of First and Second Embodiments)
4. Other Embodiments

1. First Embodiment

1-1. Configuration of Encoder

Figure 1:
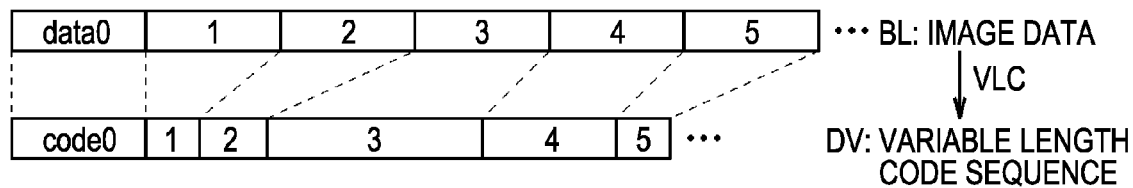
FIG. 1 is a schematic diagrammatic view showing a variable length code.
Figure 2A:
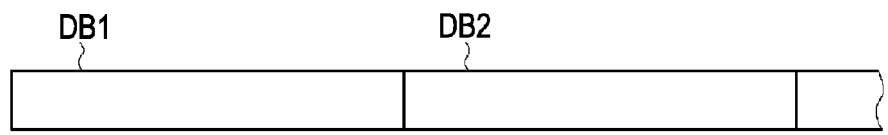
FIG. 2 is a schematic diagrammatic view provided for illustrating a variable length encoding process of the related art.
Figure 2B:
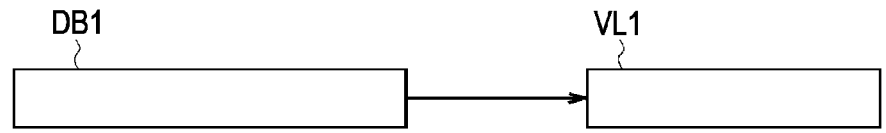
Figure 2C:
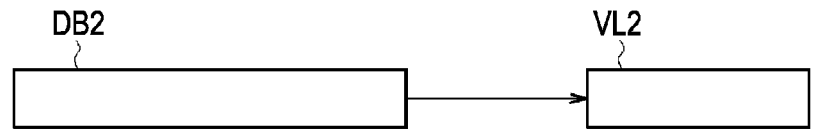
Figure 2D:
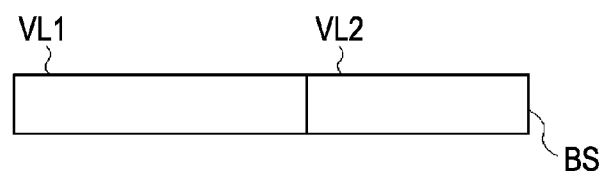
Figure 3A:
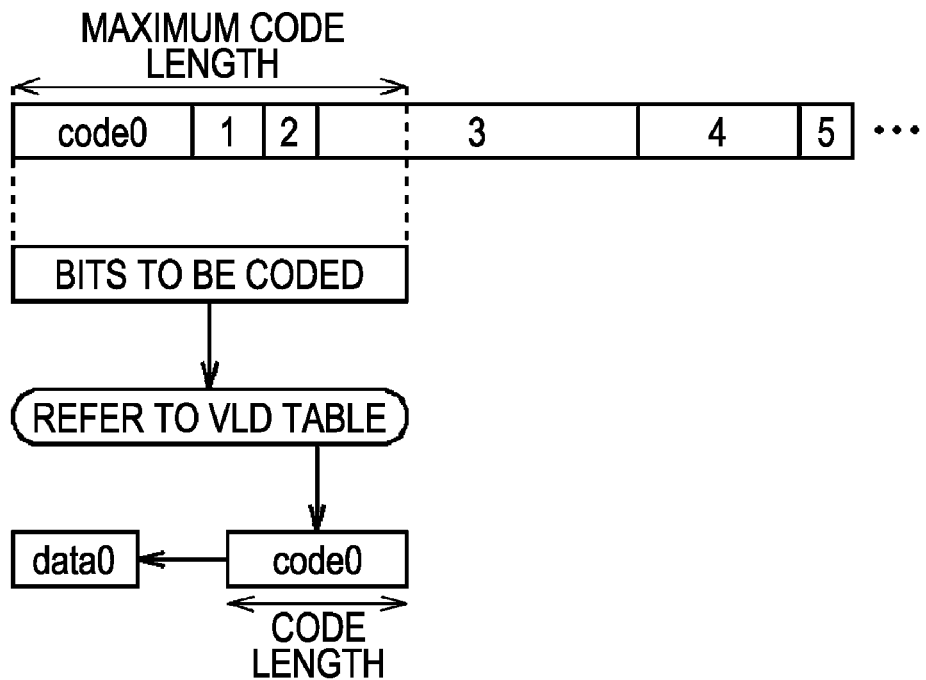
FIG. 3 is a schematic diagrammatic view provided for illustrating a variable length decoding process of the related art.
Figure 3B:
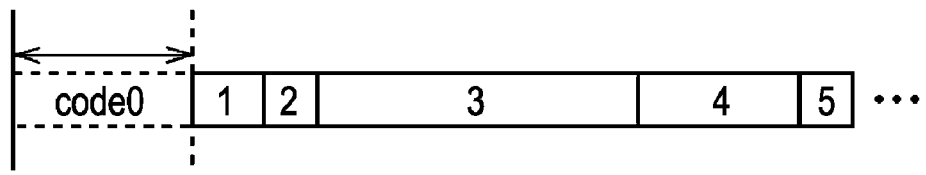
Figure 3C:
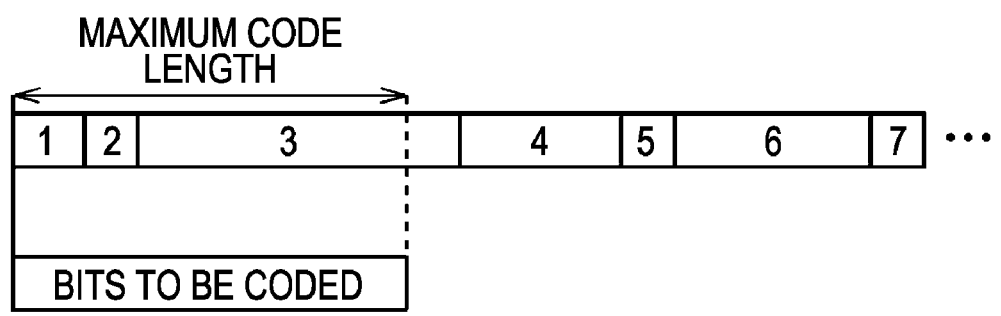
Figure 4:
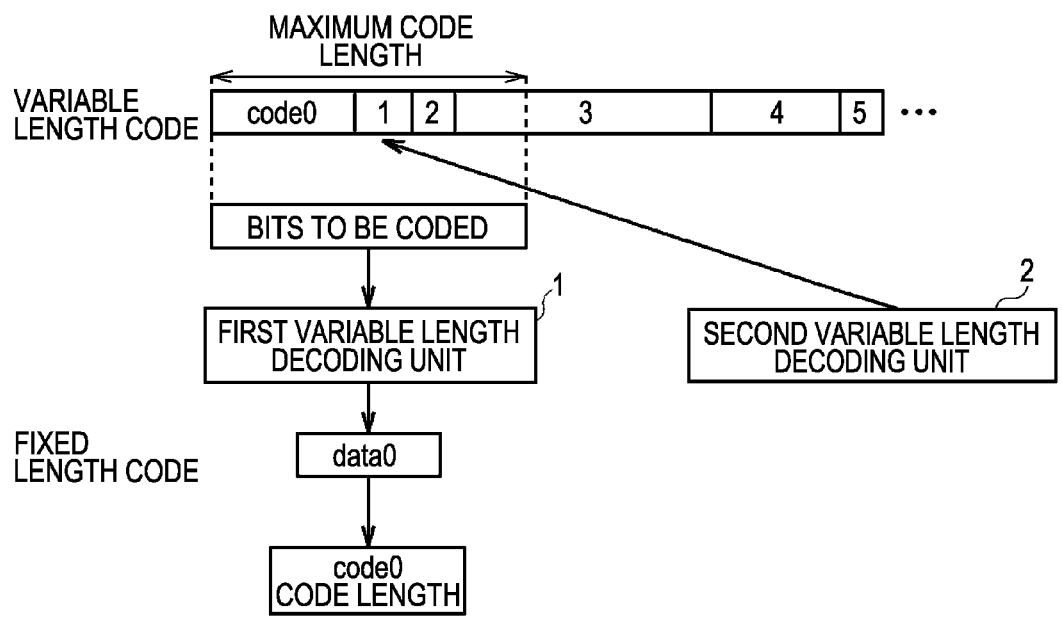
FIG. 4 is a schematic diagrammatic view provided for illustrating a problem of a parallel process.
Figure 5:
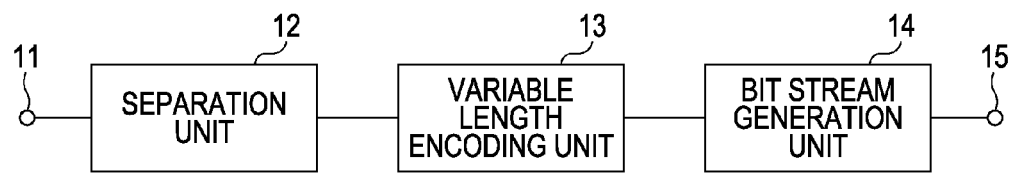
FIG. 5 is a schematic diagrammatic view showing the configuration of an encoder according to a first embodiment of the present invention.

A reference numeral 10 of FIG. 5 wholly shows an encoder. The encoder 10 executes an encoding process with respect to image data so as to generate and output a bit stream composed of variable length codes through an output terminal 15, when the image data is supplied through an input terminal 11.

Figure 6A:
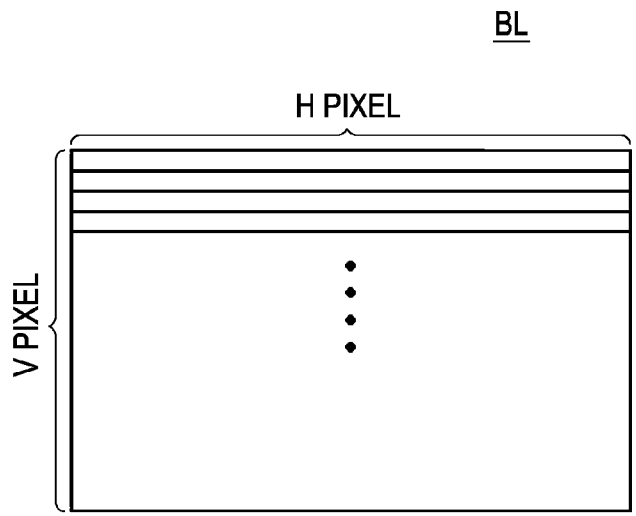
FIG. 6 is a schematic diagrammatic view showing the structure of image data according to the first embodiment of the present invention.
Figure 6B:
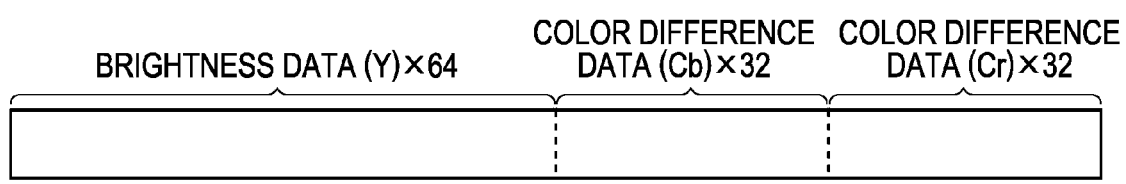

In detail, the input terminal 11 supplies the input image data to a separation unit 12. As shown in FIG. 6, one frame of the image data BL is composed of H pixels×V pixels. The image data BL is composed at a 4:2:2 format, and a pixel value corresponding to 64 pixels is represented by 64 pieces of luminance data Y composed of fixed length codes and 32 pieces of color difference data Cb and Cr composed of fixed length codes.

In the image data BL, using a block corresponding to 64 pixels as a processing block, an image corresponding to one frame is represented by processing blocks in number corresponding to the pixel number of one frame.

Figure 7:
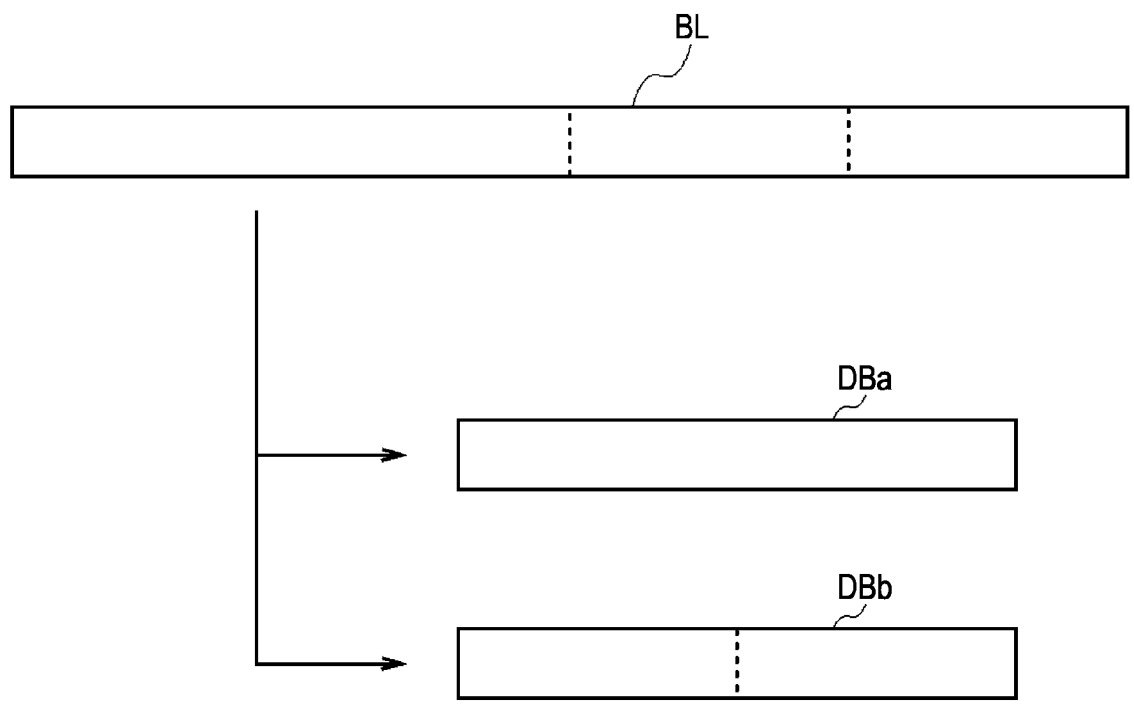
FIG. 7 is a schematic diagrammatic view provided for illustrating separation of data according to the first embodiment of the present invention.

When the image data BL is supplied, the separation unit 12 separates the image data BL into processing blocks as shown in FIG. 7 and separates the processing blocks into the luminance data Y and the color difference data Cb and Cr. Hereinafter, the separated luminance data Y is called a first half block DBa and the color difference data Cb and Cr is called a second half block DBb.

The separation unit 12 supplies the first half block DBa and the second half block DBb to a variable length encoding unit 13.

Figure 8A:
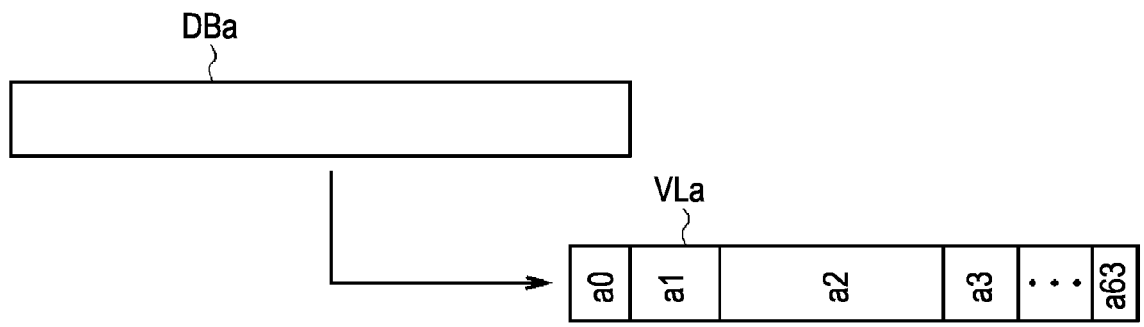
FIG. 8 is a schematic diagrammatic view provided for illustrating variable length decoding according to the first embodiment of the present invention.
Figure 8B:
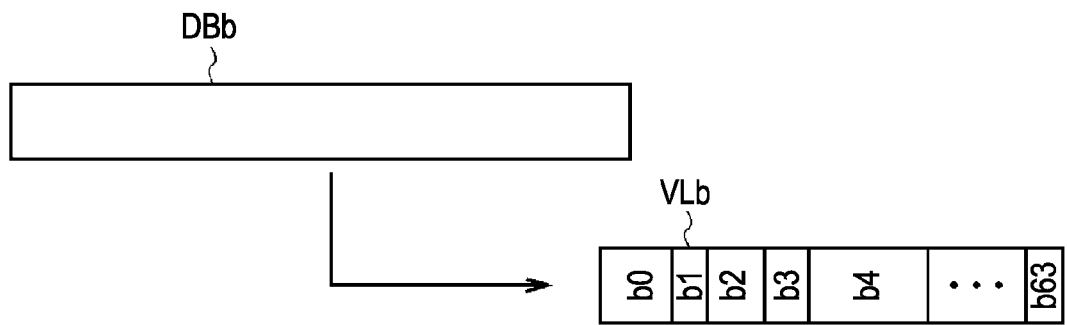

As shown in FIG. 8, the variable length encoding unit 13 (FIG. 5) variable-length-encodes the first half data block DBa and the second half block DBb using a Variable Length Coding (VLC) table and generates a first half variable length code sequence VLa and a second half variable length code sequence VLb composed of variable length codes. As a result, the first half variable length code sequence VLa and the second half variable length code sequence VLb have 64 variable length codes a0 to a63 and b0 to b63, respectively.

In addition, the variable length encoding unit 13 simultaneously performs a quantization process of fixed length codes or a post-quantization process due to a lower bitplane rounding off operation such that the first half variable length code sequence VLa and the second half variable length code sequence VLb are suppressed to a predetermined code amount or less.

The variable length encoding unit 13 supplies the first half variable length code sequence VLa and the second half variable length code sequence VLb to a bit stream generation unit 14 (FIG. 5).

As shown in FIGS. 9A and 9B, the bit stream generation unit 14 couples the first half variable length code sequence VLa and the second half variable length code sequence VLb. At this time, the bit stream generation unit 14 inserts dummy data between the first half variable length code sequence VLa and the second half variable length code sequence VLb as a buffer data DD so as to generate a code length fixed block VLx having a fixed code length.

In addition, the bit stream generation unit 14 may not insert the buffer data DD, if the code length obtained by adding the first half variable length code sequence VLa and the second half variable length code sequence VLb is equal to the fixed code length of the code length fixed block VLx.

At this time, as shown in FIGS. 9C and 9D, the bit stream generation unit 14 inverts the second half variable length code sequence VLb in a mirror shape such that leading bits of the second half variable length code sequence VLb are placed on a rearmost portion of the code length fixed block VLx. For example, if the second half variable length code sequence VLb is "0110001001100 . . . ", it is rearranged to " . . . 0011001000110".

The bit stream generation unit 14 sequentially generates and couples the code length fixed block VLx so as to generate a bit stream BSw.

The above-described encoding process may be executed by hardware or software. If the encoding process is realized by software, the encoder 10 is virtually formed in a Central Processing Unit (CPU) and a Random Access Memory (RAM). In addition, an encoding program stored in a Read Only Memory (ROM) is developed so as to execute the encoding process.

The encoder 10 separates the processing block into two blocks (the first half block DBa and the second half block DBb), performs the VLC process, and generates the first half variable length code sequence VLa and the second half variable length code sequence VLb. The encoder 10 inserts the buffer data DD so as to couple the first half variable length code sequence VLa and the second half variable length code sequence VLb and generates the code length fixed block VLx having the fixed code length.

To this end, the encoder 10 can make a gap between the leading bit and the rearmost bit of the code length fixed block VLx constant.

1-2. Configuration of Decoder

Figure 10:
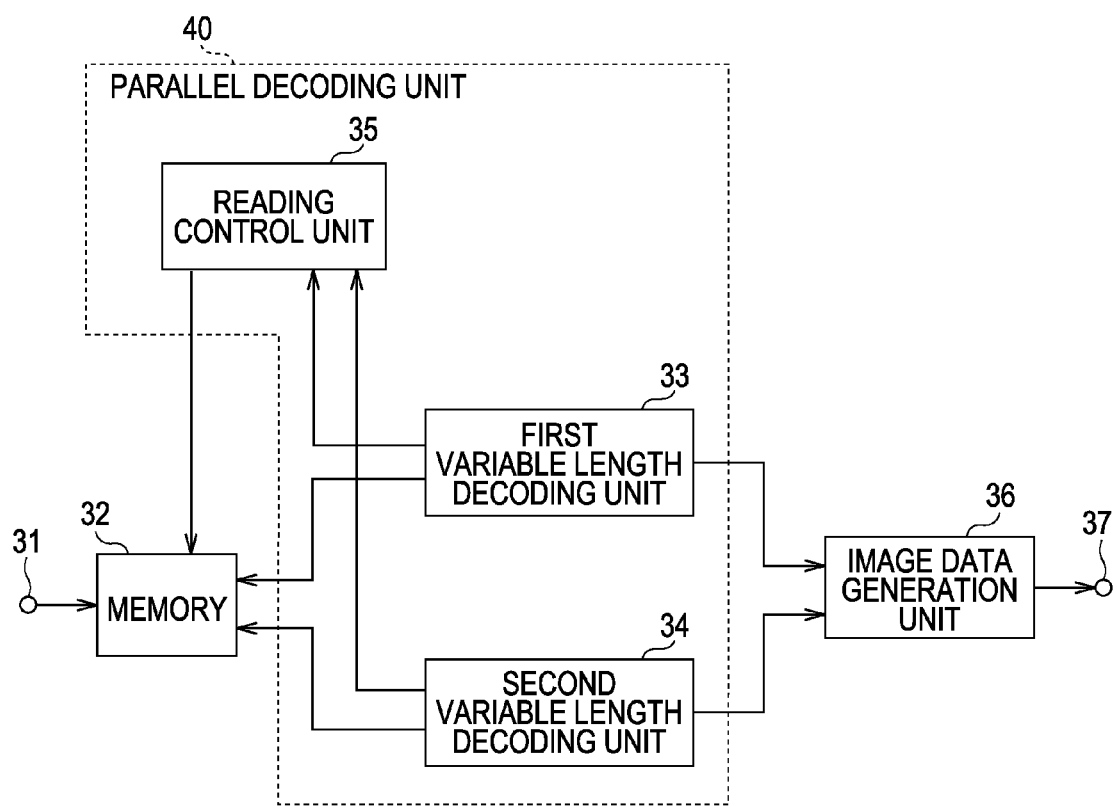
FIG. 10 is a schematic diagrammatic view showing the configuration of a decoder according to the first embodiment of the present invention.

Next, a decoder 30 for decoding a bit stream BSw will be described. As shown in FIG. 10, when the bit stream BSw is supplied, the decoder 30 executes a parallel decoding process, which is a variable length decoding process, with respect to the bit stream BSw, and generates image data BL.

When the bit stream BSw is supplied through an input terminal 31, the decoder 30 starts the parallel decoding process and simultaneously generates decoded data composed of fixed length codes by two decoding units (a first decoding unit 33 and a second decoding unit 34) from the bit stream BSw. The decoder 30 outputs the image data BL composed of the decoded data through an output terminal 36.

Figure 11A:
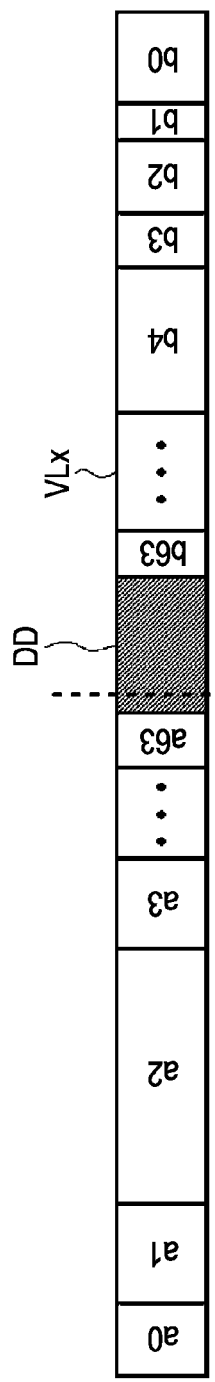
FIG. 11 is a schematic diagrammatic view provided for illustrating reading of data according to the first embodiment of the present invention.

As shown in FIG. 11A, the bit stream BSw is formed by arranging the code length fixed block VLx having the fixed code length. Accordingly, the decoder 30 can recognize a start end and a termination end of the code length fixed block VLx from the code length of the code length fixed block VLx and calculate a decoding start position in the bit stream BSw.

Figure 11B:
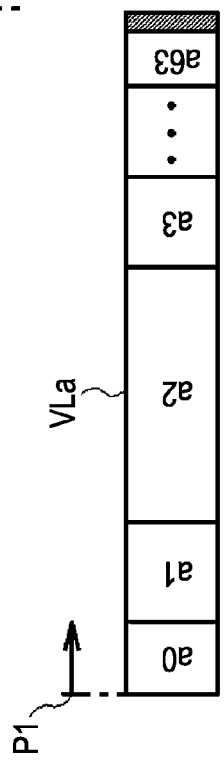

Accordingly, as shown in FIG. 11B, the decoder 30 specifies the start end of the code length fixed block VLx as the decoding start position and sets a start pointer P1 indicating a reading start position at the start end. The decoder 30 can sequentially read data from the start pointer P1 backward so as to read the first half variable length code sequence VLa.

Figure 11C:
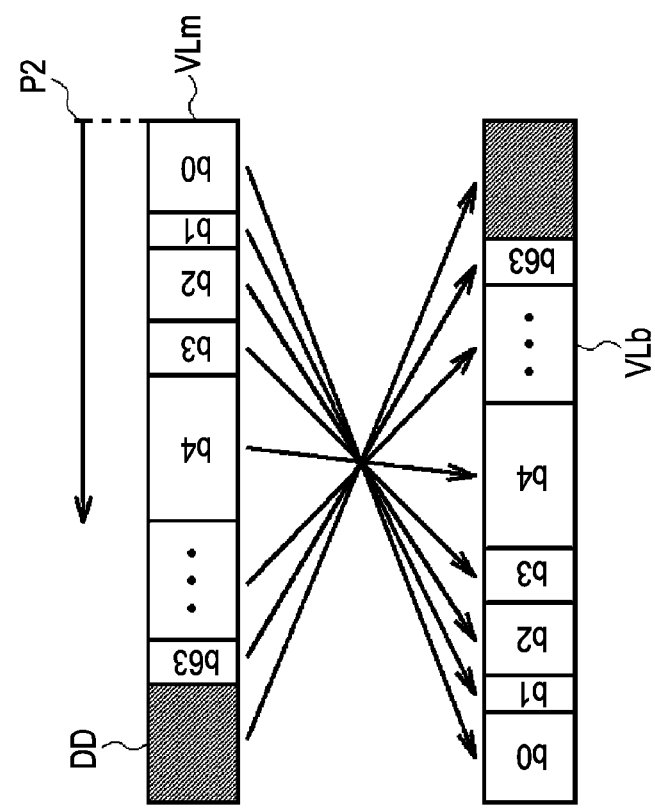

In addition, as shown in FIG. 11C, the code length fixed block VLx includes a second half mirror variable length code sequence VLm in a second half portion thereof. The second half mirror variable length code sequence VLm is mirrored from the second half variable length code sequence VLb, and the termination end thereof forms the termination end of the code length fixed block VLx.

Figure 11D:

To this end, the decoder 30 specifies the termination end of the code length fixed block VLx as the decoding start position and sets a start pointer P2 at the termination end. The decoder 30 can sequentially read data forward from the start pointer so as to read the second half mirror variable length code sequence VLm as the second half variable length code sequence VLb, as shown in FIG. 11D.

The decoder 30 moves the start pointer by the number used for decoding so as to variable-length-decode bits to be decoded, which are sequentially read from the first half variable length code sequence VLa and the second half variable length code sequence VLb, thereby generating the decoded data. Hereinafter, a series of processes of reading and variable length decoding the bits to be decoded is called a decoded data generating process.

That is, as shown in FIG. 12, the decoder 30 executes the decoded data generating process with respect to the first half variable length code sequence VLa by the first variable length decoding unit 33 and generates first half decoded data BBa. In addition, the decoder 30 executes the decoded data generating process with respect to the second half variable length code sequence VLb by the second variable length decoding unit 34 and generates second half decoded data BBb.

Figure 13:
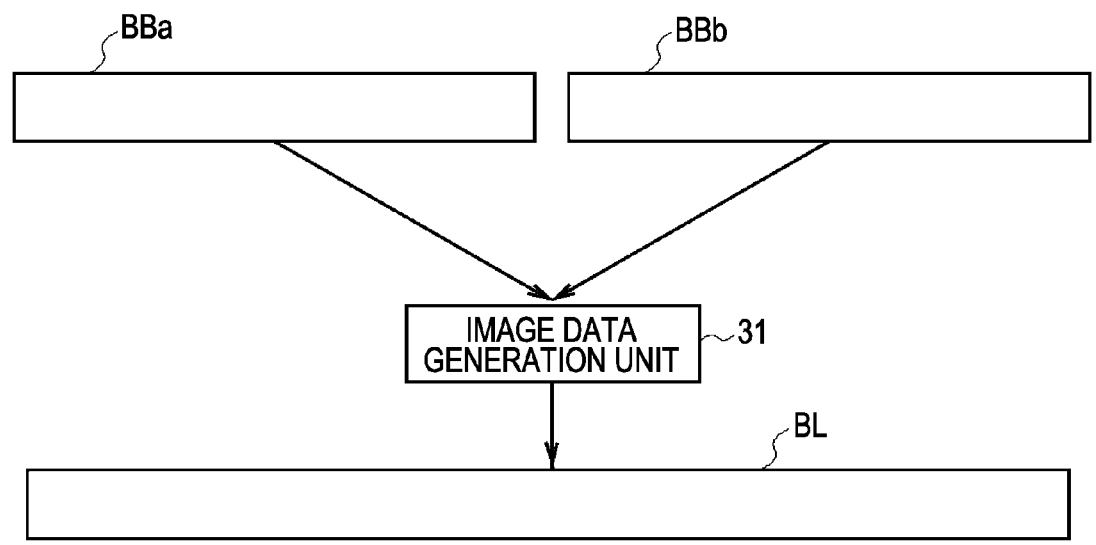
FIG. 13 is a schematic diagrammatic view provided for generation of image data according to the first embodiment of the present invention.

As shown in FIG. 13, the decoder 30 couples the first half decoded data BBa and the second half decoded data BBb by an image data generating unit 36 and sequentially connects the coupled decoded blocks so as to generate the image data BL.

In detail, the decoder 30 (FIG. 10) supplies the bit stream BSw supplied through the input terminal 31 to a memory 32. As a result, data of the bit stream BSw is sequentially stored in the memory 32.

A reading control unit 35 of a parallel decoding unit 40 recognizes a leading portion of the bit stream BSw as the leading bits (that is, the decoding start position) of a first code length fixed block VLx. The reading control unit 35 sets the start pointer P1 corresponding to the first variable length decoding unit 33 and starts reading from the leading bits of the code length fixed block VLx backward (that is, a normal direction).

That is, the reading control unit 35 reads and supplies data (that is, bits to be decoded) by the same bit number as a maximum code amount of a variable length code from the leading bits of the code length fixed block VLx to the first variable length decoding unit 33. As a result, the bits to be decoded are stored in a buffer memory (not shown) of the first variable length decoding unit 33.

The first variable length decoding unit 33 generates decoded data from the bits to be decoded by referring to a Variable Length Decoding (VLD) table and supplies the data to the image data generating unit 36. The reading control unit 35 moves the start pointer P1 by the number used for generating the decoded data and starts the reading of the next bits to be decoded.

When 64 pieces of decoded data are generated, the reading control unit 35 recognizes that the variable length decoding of the first half variable length code sequence VLa which is currently being processed is finished, and moves the start pointer P1 to the start end portion of a next code length fixed block VLx. That is, the reading control unit 35 moves the start pointer P1 to a position later than the start end of the first half variable length code sequence VLa (that is, the code length fixed block VLx), which is currently being processed, by the fixed code length of the code length fixed block VLx.

To this end, the reading control unit 35 can move the start pointer P1 to the start end which is the decoding start position of the next code length fixed block VLx, that is, the start end of the first half variable length code sequence VLa, and start the decoded data generating process of a next first half variable length code length VLa.

In addition, the position moved backward from the leading bits of the first code length fixed block VLx having set the start pointer P1 by the fixed code length of the code length fixed block VLx becomes the start end of the next code length fixed block VLx.

Then, the reading control unit 35 recognizes that earlier than the start end of the next code length fixed block VLx by 1 [bit] as the termination end (that is, the decoding start position) of the code length fixed block VLx, (which is currently being processed, and sets the start pointer P2 corresponding to the second variable length decoding unit 34.

That is, the reading control unit 35 sets the start pointer P2 at a position obtained by the leading bits of the code length fixed block VLx minus the fixed code length of 1 [bit]. The reading control unit 35 starts the reading of the bits to be coded forward (that is, the reverse direction of the normal direction) from the rearmost bit of the code length fixed block VLx.

The reading control unit 35 reads and supplies data (that is, bits to be decoded) by the same bit number as a maximum code amount of a variable length code from the rearmost bits of the code length fixed block VLx to the second variable length decoding unit 34. As a result, the bits to be decoded are stored in a buffer memory (not shown) of the second variable length decoding unit 34.

The second variable length decoding unit 34 generates decoded data from the bits to be decoded by referring to a VLD table and supplies the data to the image data generating unit 36. The reading control unit 35 moves the start pointer P2 in a reverse direction to that used for generating the decoded data and starts the reading of the next bits to be decoded.

When 64 pieces of decoded data are generated, the reading control unit 35 recognizes that the variable length decoding of the second half variable length code sequence VLb which is currently being processed is finished, and moves the start pointer P2 to the termination end (that is, the decoding start position) of a next code length fixed block VLx. That is, the reading control unit 35 moves the start pointer P2 to a position later than the termination end of the second half mirror variable length code sequence VLm (that is, the code length fixed block VLx), which is currently being processed, by the fixed code length of the code length fixed block VLx.

To this end, the reading control unit 35 can move the start pointer to the termination end which is the decoding start position of the next code length fixed block VLx, that is, the start end of the second half mirror variable length code sequence VLm, and start the decoded data generating process of a next second half variable length code length VLb.

The image data generating unit 36 arranges and couples the 64 pieces of decoded data (that is, the first half decoded data BBa) supplied from the first variable length decoding unit 33 and the 64 pieces of decoded data (that is, the second half decoded data BBb) supplied from the second variable length decoding unit 34. In addition, the image data generating unit 36 sequentially connects the coupled decoded blocks so as to generate the image data BL.

The above-described parallel decoding process may be executed by hardware or software. If the parallel decoding process is realized by software, the decoder 30 is virtually formed in a CPU and a RAM. In addition, a decoding program stored in a ROM is developed so as to execute the parallel decoding process.

The decoder 30 simultaneously executes the decoded data generating process from the start end and the termination end of the code length fixed block VLx of the bit stream BSw. To this end, since the decoder 30 can execute the decoded data generating process in parallel by the two variable length decoding units, it is possible to perform the variable length decoding process at a high speed.

1-3. Detailed Procedure 1-3-1. Encoding Procedure

Figure 14:
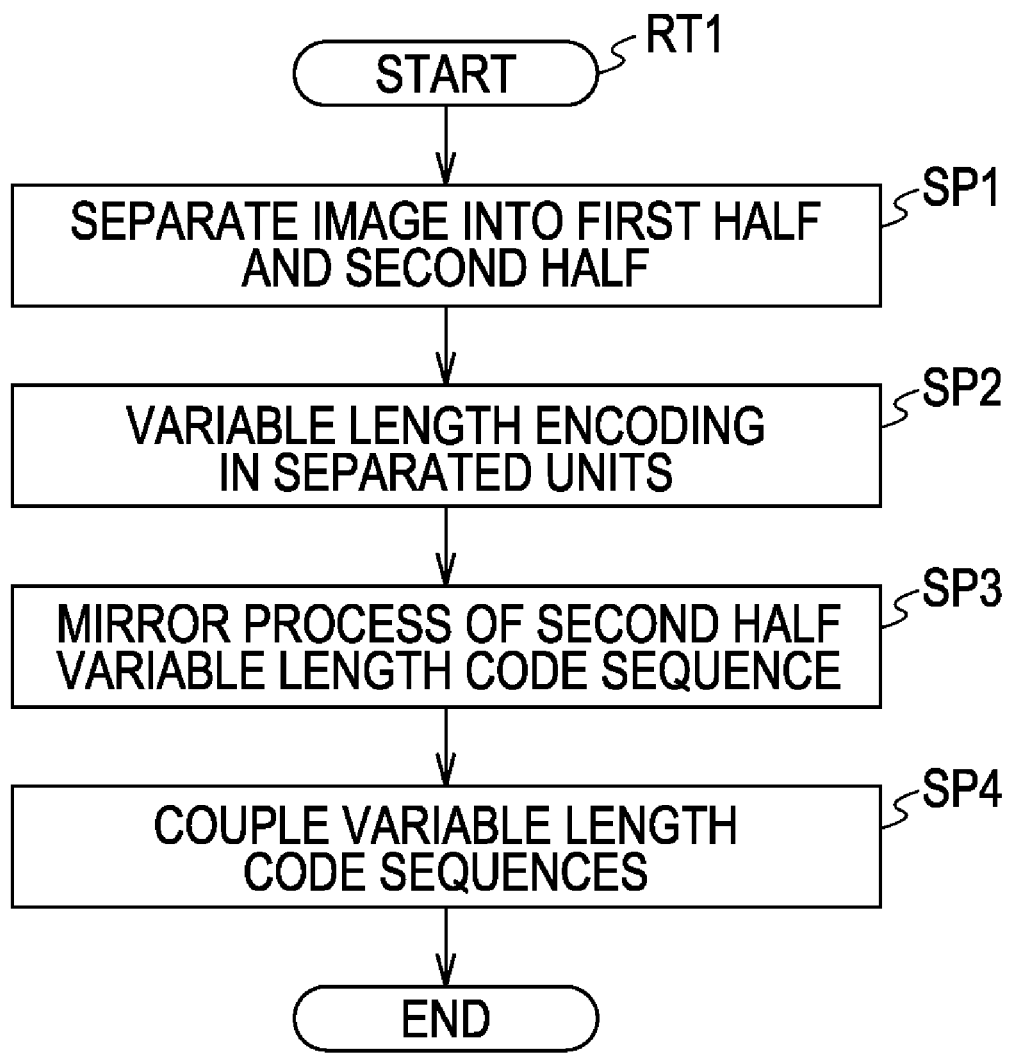
FIG. 14 is a flowchart provided for illustrating an encoding process order according to the first embodiment of the present invention.

Next, an encoding procedure RT1 executed according to an encoding program will be described using the flowchart of FIG. 14.

When the image data BL is supplied, the encoder 10 starts the encoding procedure RT1 and moves to step SP1.

In step SP1, the encoder 10 separates the image data BL into the first half block DBa and the second half block DBb and then moves to next step SP2.

In step SP2, the encoder 10 variable-length-encodes the image data BL in the separated units (that is, the first half block DBa and the second half block DBb) so as to generate the first half variable length code sequence VLa and the second half variable length code sequence VLb, and then moves to next step SP3.

In step SP3, the encoder 10 executes mirror processing with respect to the second half variable length code sequence VLb so as to generate the second half mirror variable length code sequence VLm, and then moves to next step SP4.

In step SP4, the encoder 10 couples the first half variable length code sequence VLa and the second half mirror variable length code sequence VLm by inserting the buffer data DD therebetween so as to generate the code length fixed block VLx having the fixed code length. Then, the encoder 10 couples the newly generated code length fixed block VLx to the previously generated code length fixed block VLx so as to generate the bit stream BSw, and then moves to an end step so as to finish the encoding procedure RT1.

1-3-2. Parallel Decoding Procedure

Figure 15:
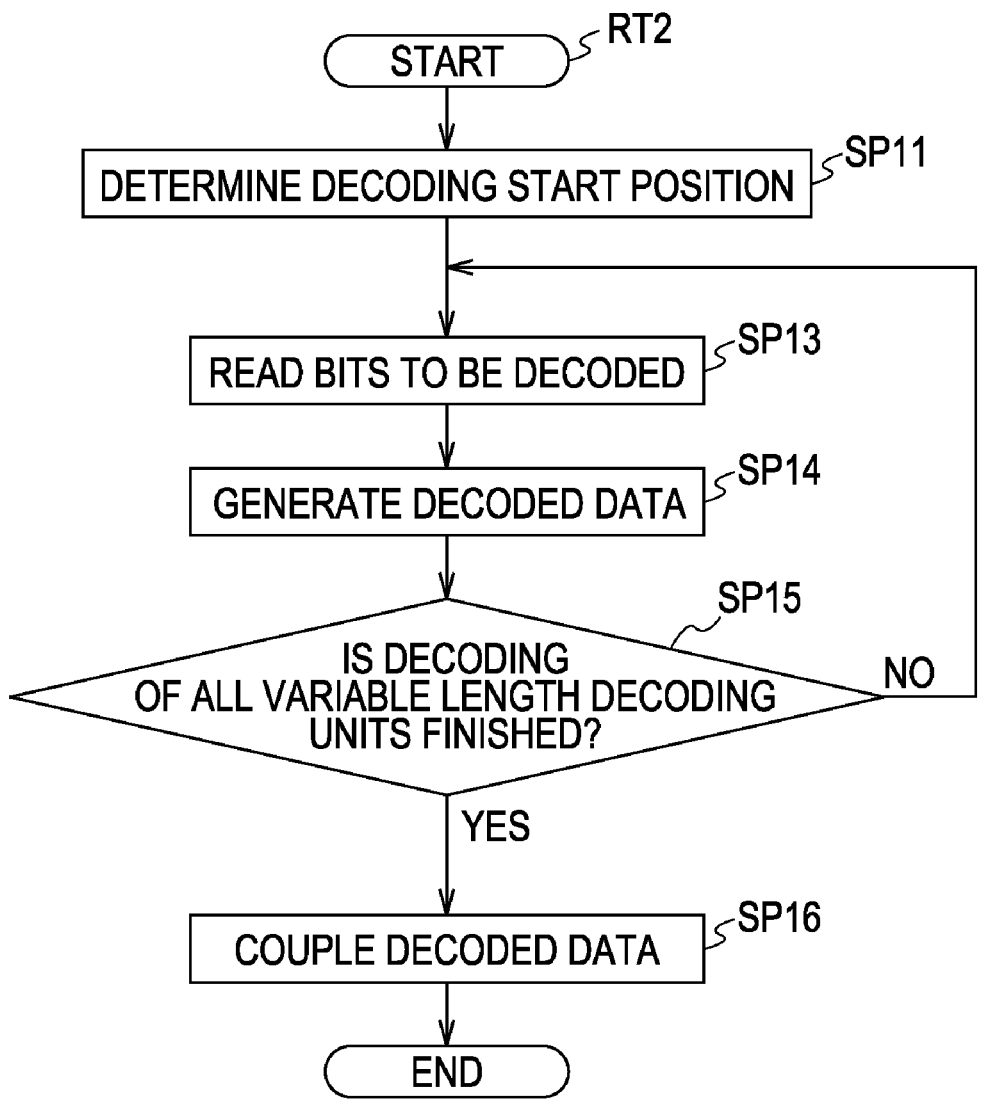
FIG. 15 is a flowchart provided for illustrating a parallel decoding process order according to the first embodiment of the present invention.

Next, a parallel decoding procedure RT2 executed according to a parallel decoding program will be described using the flowchart of FIG. 15.

When the bit stream BSw is supplied, the decoder 30 starts the parallel decoding procedure RT2, sequentially stores the supplied bit stream BSw in the memory 32, and moves to next step SP11.

In step SP11, the decoder 30 sets the start end and the termination end of the code length fixed block VLx to be processed in the memory 32 as the decoding start position.

That is, the decoder 30 determines the start ends of the code length fixed block VLx as the decoding start position of the first variable length decoding unit 33 and sets the start pointer P1 indicating the reading start position. In addition, the decoder 30 determines the termination end of the code length fixed block VLx as the decoding start position of the second variable length decoding unit 34, sets the start pointer P2, and then moves to next step SP13.

In step SP13, the decoder 30 reads the data from the memory 32 in the normal direction from the start pointer P1 and in the reverse direction from the start pointer P2 so as to read sequentially the bits to be decoded, and then moves to next step SP14.

In step SP14, the decoder 30 generates the decoded data by referring to the VLD table from the bits to be decoded and then moves to next step SP15.

In step SP15, the decoder 30 determines whether the generation of the decoded data of the code length fixed block VLx to be processed is finished in all the variable length decoding units.

If a negative result is obtained, it is indicated that a variable length code to be variable-length-decoded is present in the code length fixed block VLx. At this time, the decoder 30 returns to step SP13, starts the reading of the bits to be decoded from the position obtained by moving the start pointers P1 and P2 by the number of bits to be decoded, which are used for generating the decoded data in step SP14, and continues to perform the processing.

In contrast, if a positive result is obtained in step SP15, the decoder 30 couples the first half decoded data BBa and the second half decoded data BBb so as to generate the decoded block. Then, the decoder 30 couples the newly generated decoded block and the previously generated decoded block so as to generate the image data BL, and then moves to an end step so as to finish the parallel decoding process.

1-4. Operation and Effect

In the above-described configuration, the encoder 10 separates the image data BL into the first half block DBa and the second half block DBb, which are the plurality of data blocks. The encoder 10 variable-length-encodes the first half block DBa and the second half block DBb so as to generate the variable length code sequence.

The encoder 10 combines the first half variable length code sequence VLa and the second half variable length code sequence VLb, which are the two variable length code sequences generated by the variable length encoding unit 13, so as to generate the code length fixed block VLx as the code block variable-length-encoded in parallel from the start end and the termination end. At this time, the encoder 10 arranges the code length fixed block VLx so as to generate the bit stream BSw such that the boundary of the code length fixed block VLx is recognized.

Generally, if the variable length decoding process of the variable length code is performed in parallel, decoding start position information indicating the decoding start position may be simply contained in the bit stream. If the decoding start position information is simply contained, one piece of decoding start position information is contained with respect to one decoding start position.

Since the encoder 10 of the embodiment of the present invention starts decoding from the start end and the termination end of the code length fixed block VLx based on the boundary of the code length fixed block VLx, it is possible to specify two decoding start positions with respect to one decoding start position information which is the boundary of the code length fixed block VLx. As a result, the encoder 10 can reduce the information amount of the decoding start position information contained in the bit stream BSx and suppress the increase of the code amount due to the decoding start position information.

In addition, the encoder 10 sets the code length of the code block to a fixed length such that the boundary of the code block is recognized.

To this end, the encoder 10 can simply specify the decoding start position based on the code length even when the decoder does not detect information indicating the boundary.

The encoder 10 inserts the buffer data DD between the first half variable length code sequence VLa and the second half variable length code sequence VLb so as to fix the code length and generates the code length fixed block VLx.

To this end, the encoder 10 can generate the code length fixed block VLx with the fixed code length even when the code amount of the first half variable length code sequence VLa and the second half variable length code sequence VLb is not significantly adjusted, and reduce processing load.

The encoder 10 arranges the first half variable length code sequence VLa arranged in the first half in the normal direction from the start end and arranges the second half code sequence VLb arranged in the second half in the reverse direction from the termination end so as to generate the code length fixed block VLx.

To this end, the encoder 10 enables the decoder to read the first half variable length code sequence VLa from the start end in the normal direction and to read the second half variable length code sequence VLb from the termination end in the reverse direction, and the rearrangement of the second half variable length code sequence VLb is not performed.

The decoder 30 has a plurality of code length fixed blocks VLx composed of variable length codes and receives the bit stream BSx generated such that the boundary between the code length fixed blocks VLx is recognized. The decoder 30 specifies the start end and the termination end of the code length fixed block VLx based on the boundary of the code length fixed block VLx. In addition, the decoder 30 executes the decoded data generating process of the bit stream BSx as the variable length decoding in parallel from the start end and the termination end of the code length fixed block VLx.

To this end, since the decoder 30 executes the decoded data generating process in parallel using the start end and the termination end of the code length fixed block VLx as the decoding start position, it is possible to perform the variable length decoding process of the bit stream BSx at a high speed.

The decoder 30 executes the decoded data generating process of the variable length fixed block VLx composed of the first half variable length code sequence VLa arranged from the start end in the normal direction and the second half variable length code sequence arranged from the termination end in the reverse direction using the same decoding table (that is, the VLD table).

The decoder 30 can read the second half variable length code sequence VLb in the reverse direction so as to read the second half variable length code sequence VLb in a correct order. To this end, the decoder 30 can execute the decoded data generating process with respect to the second half variable length code sequence VLb using the common VLD table with the first half variable length code sequence VLa, even when the mirrored VLD table is not intentionally prepared.

By the above-described configuration, the encoder 10 separates the image data BL in the processing block units, combines the two variable length code sequences (the first half variable length code sequence VLa and the second half variable length code sequence VLb) generated by variable length encoding, and generates the code length fixed block VLx which is one code block. In addition, the encoder 10 generates the bit stream BSx such that the boundary of the code length fixed block VLx is recognized.

To this end, the decoder 30 can specify the two decoding start positions (the start end of the first half variable length code sequence VLa and the termination end of the second half variable length code sequence VLb) from the boundary of the code length fixed block VLx, and execute the decoded data generating process in parallel.

Accordingly, the present invention can realize an encoder, an encoding method and a recording medium having an encoding program recorded thereon, a decoder, a decoding method and a recording medium having a decoding program recorded thereon, which are capable of performing a variable length decoding process at a high speed.

2. Second Embodiment

FIGS. 16 to 28 show a second embodiment of the present invention, in which portions corresponding to those of the first embodiment shown in FIGS. 5 to 15 are denoted by the same reference numerals. An encoder 50 of the second embodiment is different from the first embodiment in a method for generating a bit stream BSr.

2-1. Configuration of Encoder

The encoder 50 executes an encoding process with respect to image data so as to generate a bit stream BSr composed of variable length codes, when the image data BL is supplied.

Figure 16:
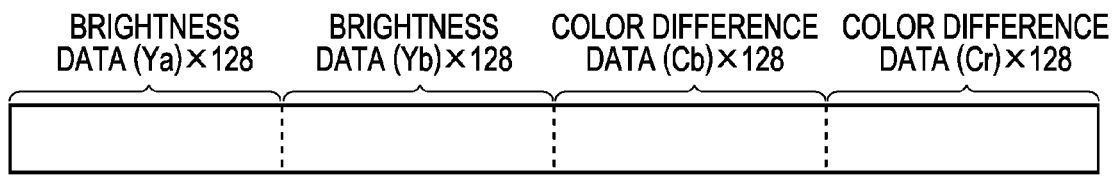
FIG. 16 is a schematic diagrammatic view showing the configuration of an encoder according to a second embodiment of the present invention.

As shown in FIG. 16, the image data BL is composed with a 4:2:2 format, and luminance data Y corresponding to 256 pixels and color difference data Cb and Cr are used as a processing block unit. The luminance data is separated into luminance data Ya composed of a high-pass component and luminance data Yb composed of a low-pass component by separating a luminance value by frequency band.

Figure 17:
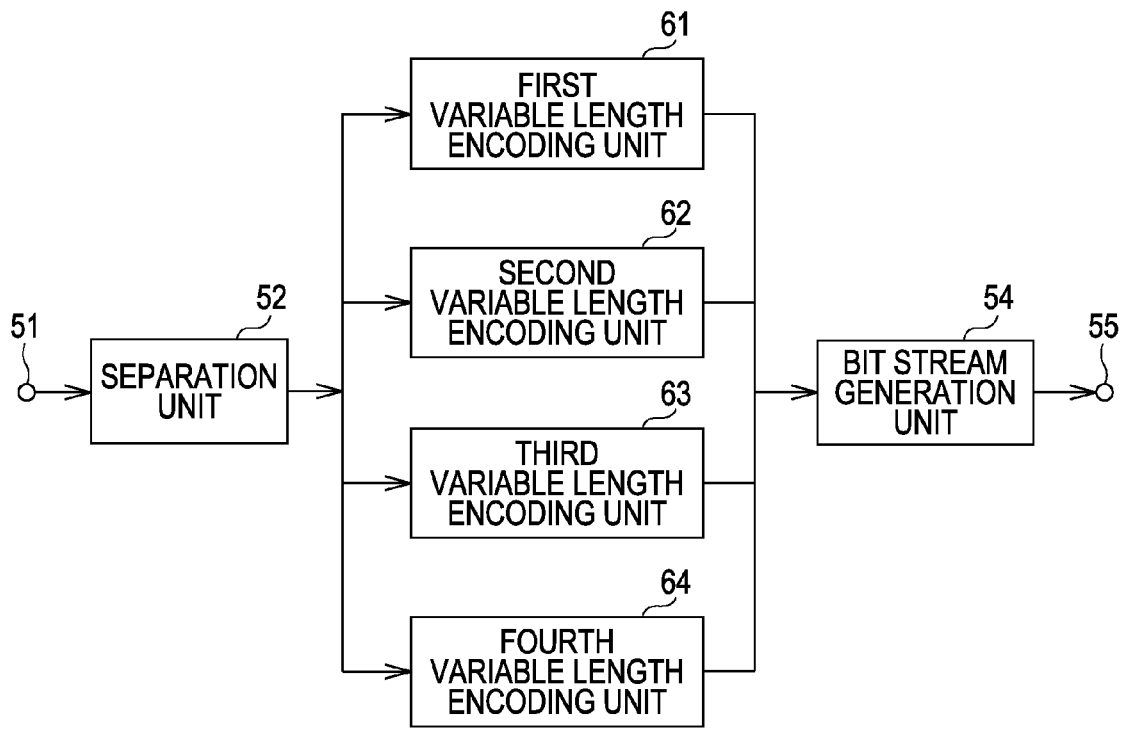
FIG. 17 is a schematic diagrammatic view showing the structure of image data according to the second embodiment of the present invention.

As shown in FIG. 17, an input terminal 51 of the encoder 50 supplies the input image data to a separation unit 52. As shown in FIG. 18, the separation unit 52 separates the supplied image data BL having the processing blocks into the luminance data Ya and Yb and color difference data Cb and Cr so as to generate sequentially the data blocks DBa to DBd.

The separation unit 52 (FIG. 17) supplies the data blocks DBa to DBd to a first variable length encoding unit 61, a second variable length encoding unit 62, a third variable length encoding unit 63 and a fourth variable length encoding unit 64, respectively. Hereinafter, these are collectively called variable length encoding units 61 to 64.

As shown in FIG. 19, the variable length encoding units 61 to 64 perform a VLC process with respect to the data blocks DBa to DBd, generate variable length code sequences VLa to VLd, and supply them to a bit stream generating unit 54.

The bit stream generating unit 54 generates a nested block VLy according to the variable length code sequences VLa to VLb and arranges the nested block VLy so as to generate the bit stream BSr.

Figure 20A:
FIG. 20 is a schematic diagrammatic view showing the configuration of a variable length code sequence according to the second embodiment of the present invention.
Figure 20B:
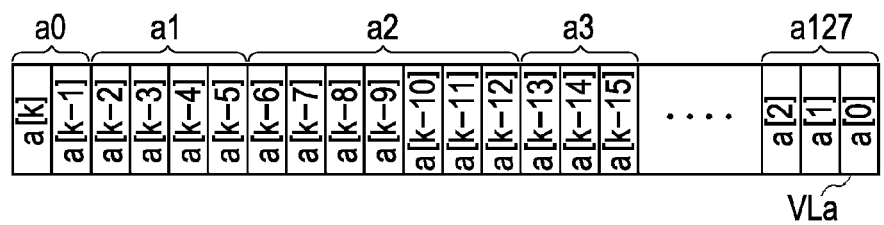

As shown in FIG. 20A, the variable length code sequence VLa is composed of 128 variable length codes a0 to a127. If numbers "k to 0" is given to codes each having 1 [bit] in the variable length code sequence VLa, the variable length code sequence VLa can be expressed as shown in FIG. 20B.

Figure 20C:
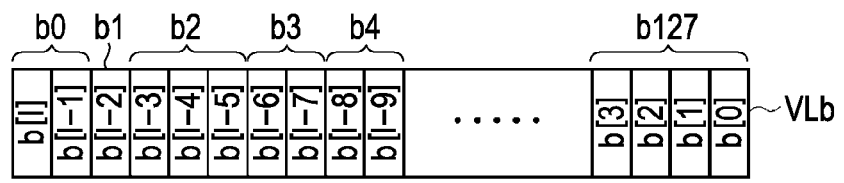
Figure 20D:
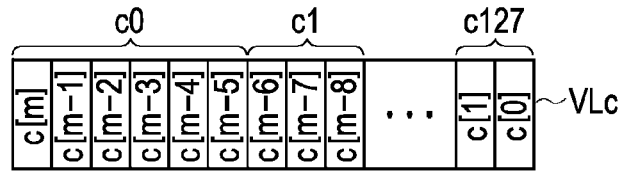
Figure 20E:
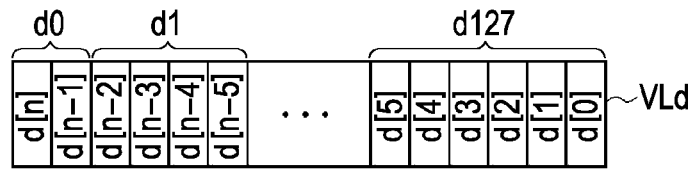

Similarly, if numbers "1 to 0", "m to 0" and "n to 0" are given to codes each having 1 [bit] in the variable length code sequence VLa, the variable length code sequences VLb to VLd can be expressed as shown in FIGS. 20C to 20E.

As shown in FIGS. 21A to 21E, the bit stream generating unit 54 extracts data from a leading bit 1 [bit] by 1 [bit] and arranges the extracted data in order of the variable length code sequences VLa, VLb, VLc and VLd. In addition, the bit stream generating unit 54 extracts data from a second bit 1 [bit] by 1 [bit] and arranges the extracted data in order of the variable length code sequences VLa, VLb, VLc and VLd. The bit stream generating unit 54 similarly executes the rearrangement of all the codes of the variable length code sequences VLa to VLd.

As a result, in the nested block VLy, the data of the variable length code sequences VLa, VLb, VLc and VLd is arranged in a nested shape, like a[k], b[l], c[m], d[n], a[k−1], b[l−1], c[m−1], d[n−1], ..., a[x], b[y], c[z] and d[v]. In addition, x, y, z and v denote variables. Hereinafter, a set of bit groups which repeatedly appear (for example, a[k], b[l], c[m] and d[n] configure a set) is called repeated bits.

Figure 21A:
FIG. 21 is a schematic diagrammatic view provided for generation of a bit stream according to the second embodiment of the present invention.
Figure 21B:
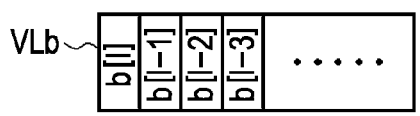
Figure 21C:
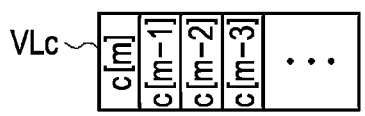
Figure 21D:
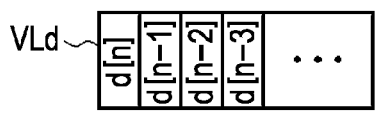
Figure 21E:
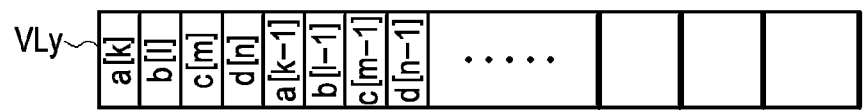
Figure 21F:
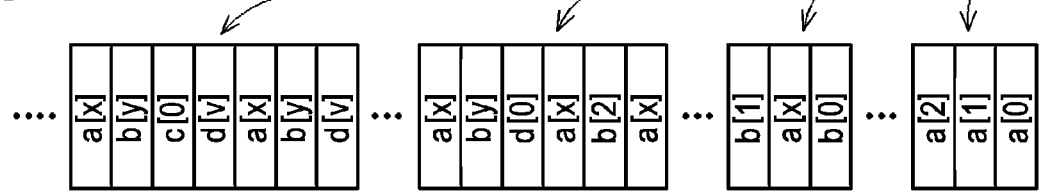

Here, the code lengths of the variable length code sequences VLa to VLd are different. To this end, data of a variable length code sequence having a short code length is lost earlier than the other variable length code sequences. In this case, as shown in FIG. 21F, the bit stream generating unit 54 continuously rearranges the data of the remaining variable length code sequences with each other in the nested shape.

That is, when the rearrangement of all the data of the variable length code sequence VLc is finished after arranging last data c[0] of the variable length code sequence VLc, the bit stream generating unit 54 continues to rearrange only the data of the remaining variable length code sequences VLa, VLb and VLd in the nest shape. As a result, in the nested block VLy, the repeated bits composed of a[x], b[y] and d[v] are sequentially arranged.

Next, when the rearrangement of all the data of the variable length code sequence VLd is finished after arranging last data d[0] of the variable length code sequence VLd, the bit stream generating unit 54 continues to rearrange alternately only the data of the remaining variable length code sequences VLa and VLb. As a result, in the nested block VLy, the repeated bits composed of a[x] and b[y] are sequentially arranged.

Next, when the rearrangement of all the data of the variable length code sequence VLb is finished after arranging last data b[0] of the variable length code sequence VLb, the bit stream generating unit 54 continuously rearranges only the data of the remaining variable length code sequence VLa. As a result, in the nested block VLy, a[x] is continuously arranged until a[0] appears.

The encoder 50 replaces the codes of the variable length code sequences VLa, VLb, VLc and VLd 1 [bit] by 1 [bit] in the nest shape so as to generate the nested block VLy, and generates the bit stream BSr in which the nested blocks VLy are consecutive.

To this end, the encoder 50 can arrange the data of the variable length code sequences VLa, VLb, VLc and VLd of the bit stream BSr at a predetermined recording interval (that is, at an interval of 4 [bits]).

2-2. Configuration of Decoder

Figure 22:
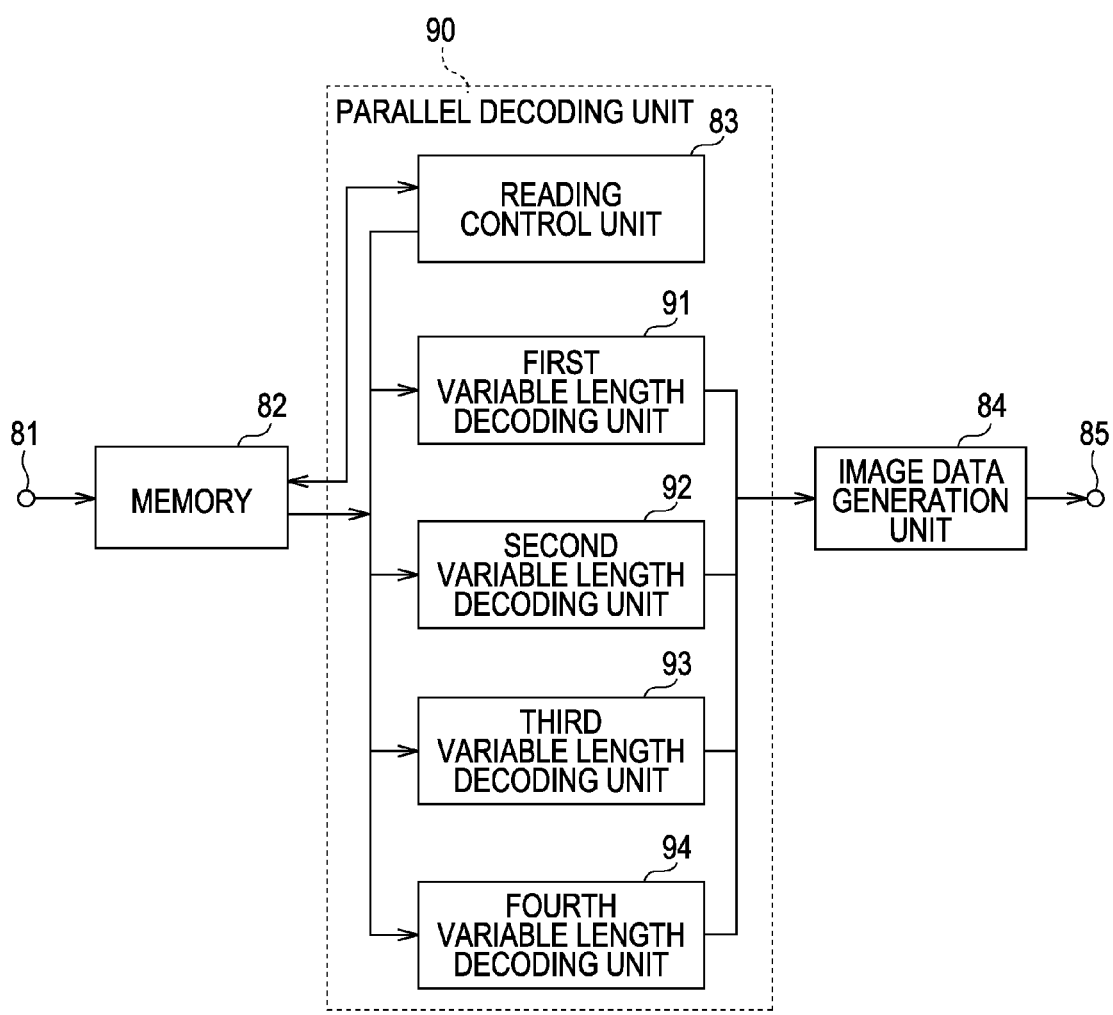
FIG. 22 is a schematic diagrammatic view showing the configuration of a decoder according to the second embodiment of the present invention.

As shown in FIG. 22, when the bit stream BSr is supplied, a decoder 80 executes a parallel decoding process, which is a variable length decoding process, with respect to the bit stream BSr so as to generate image data BL.

When the bit stream BSr composed of the nested blocks VLy is supplied, an input terminal 81 of the decoder 80 supplies it to a memory 82. The memory 82 sequentially stores the supplied nested blocks VLy according to the control of a reading control unit 83.

The decoder 80 has four variable length decoding units 91 to 94 (that is, a first variable length decoding unit 91, a second variable length decoding unit 92, a third variable length decoding unit 93 and a fourth variable length decoding unit 94) and a parallel decoding unit 90 including the reading control unit 83. The variable length decoding units 91 to 94 respectively decode the data of the variable length code sequences VLa, VLb, VLc and VLd according to the control of the reading control unit 83.

As described above, in the nested block VLy, the data of the variable length code sequences VLa, VLb, VLc and VLd is recorded in the nested shape. The reading control unit 83 generates decoding start position information and reading interval information from an address in which the nested block VLy is recorded and supplies them to the variable length decoding units 91 to 94. In addition, the decoding start position information is information indicating the address of the memory 82 in which the variable length decoding units 91 to 94 start to perform the variable length decoding of the nested blocks VLy. In addition, the reading interval information indicates an interval in which the variable length decoding units 91 to 94 read the data.

At this time, the reading control unit 83 supplies the decoding start position information indicating a leading bit of the nested block VLy to be processed, a second bit from the leading bit, a third bit from the first bit and a fourth bit from the first bit to the variable length decoding units 91 to 94, respectively. In addition, the reading control unit 83 supplies the reading interval information indicating "4" to the variable length decoding units 91 to 94, respectively.

As shown in FIGS. 23A and 23B, the first variable length decoding unit 91 sets a start pointer P1 indicating a reading start position at a leading bit of the nested block VLy stored in the memory 82 according to the decoding start position information, and reads the data from the start pointer P1 at the interval of 4 [bits]. That is, the first variable length decoding unit 91 reads only the data derived from the variable length code sequence VLa as bits to be decoded and temporarily it in a buffer memory (not shown).

As shown in FIGS. 23C and 23D, the second variable length decoding unit 92 sets a start pointer P2 at a second [bit] from the leading bit of the nested block VLy stored in the memory 82 according to the decoding start position information, and reads the data from the start pointer P2 at the interval of 4 [bits]. That is, the second variable length decoding unit 92 reads only the data derived from the variable length code sequence VLb as bits to be decoded and temporarily stores it in the buffer memory (not shown).

Although not shown, the third variable length decoding unit 93 sets a start pointer P3 at a third [bit] from the leading bit of the nested block VLy stored in the memory 82 according to the decoding start position information, and reads the data from the start pointer P3 at the interval of 4 [bits]. That is, the third variable length decoding unit 93 reads only the data derived from the variable length code sequence VLc as bits to be decoded and temporarily stores it in the buffer memory (not shown).

Although not shown, the fourth variable length decoding unit 94 sets a start pointer P4 at a fourth [bit] from the leading bit of the nested block VLy stored in the memory 82 according to the decoding start position information, and reads the data from the start pointer P4 at the interval of 4 [bits]. That is, the fourth variable length decoding unit 94 reads only the data derived from the variable length code sequence VLd as bits to be decoded and temporarily stores it in the buffer memory (not shown).

Figure 24A:
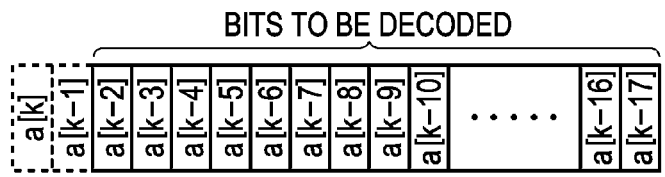
FIG. 24 is a schematic diagrammatic view provided for illustrating reading (2) of bits to be decoded according to the second embodiment of the present invention.

Next, as shown in FIG. 24A, the first variable length decoding unit 91 variable-length-decodes the bits to be decoded using the VLD table and generates decoded data. The first variable length decoding unit 91 moves the start pointer P1 by the bit number (that is, 2 [bits]) of the data used for decoding and reads the data from the start pointer P1 at an interval of 4 [bits] as the bits to be decoded.

Figure 24B:
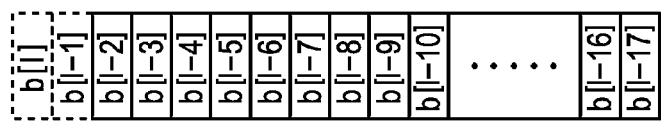
Figure 24C:
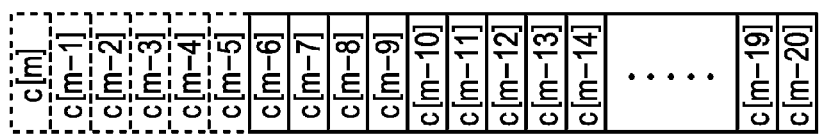
Figure 24D:
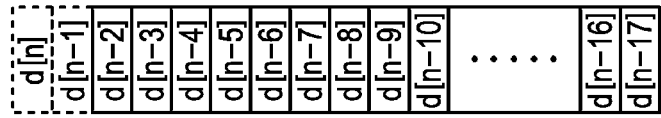

As shown in FIGS. 24B to 24D, the second variable length decoding unit 92, the third variable length decoding unit 93 and the fourth variable length decoding unit 94 similarly variable-length-decode the bits to be decoded using the VLD table and generate decoded data.

The second variable length decoding unit 92, the third variable length decoding unit 93 and the fourth variable length decoding unit 94 move the start pointers P2 to P4 by the bit number (that is, 2 [bits], 6 [bits] and 2 [bits]) used for decoding and read the data from the start pointers at an interval of 4 [bits] as the bits to be decoded, respectively.

Subsequently, the variable length decoding units 91 to 94 similarly read the bits to be decoded and continue to perform the decoded data generating process. In addition, the decoded data is temporarily stored in decoded data memories (not shown) included in the variable length decoding units 91 to 94.

Figure 24E:
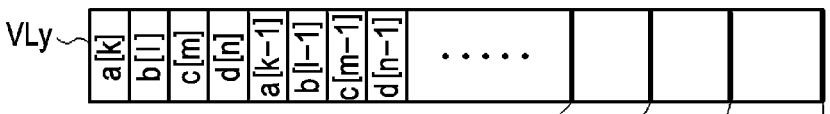
Figure 24F:
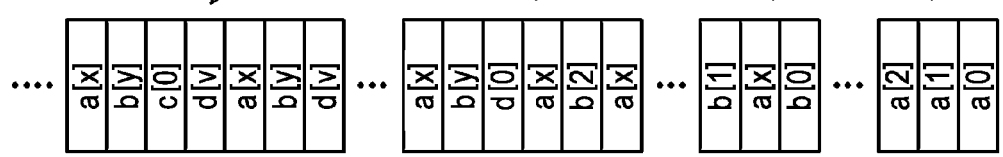

As shown in FIGS. 24E and 24F, in the termination portion of the nested block VLy, the recording interval of the data corresponding to the variable length code sequences VLa to VLd is changed.

That is, in the nested block VLy, if the data based on the variable length code sequence VLc is finished, the recording interval of the data based on the remaining variable length code sequences VLa, VLb and VLd is changed from "4" to "3".

In the nested block VLy, if the data based on the variable length code sequence VLd is finished, the recording interval of the data based on the remaining variable length code sequences VLa and VLb is changed from "3" to "2".

In the nested block VLy, if the data based on the variable length code sequence VLd is finished, the recording interval of the data based on the remaining variable length code sequences VLa is changed from "2" to "1", and the variable length code sequence VLa is consecutively recorded.

Accordingly, the variable length decoding units 91 to 94 do not generate decoded data based on the variable length code sequences VLa to VLd, if the bits to be decoded are read to the termination portion of the nested block VLy at the reading interval of "4".

The decoder 80 reads the bits to be decoded from the memory 82 according to the change in the recording interval in the termination portion of the nested block VLy, and executes a termination process of performing the decoded data generating process of generating the decoded data again.

In detail, if the process of generating $128^{th}$ decoded data is finished, the variable length decoding units 91 to 94 move the start pointers by the number used for the decoded data, similar to $127^{th}$ decoded data.

At this time, the reading control unit 83 confirms the positions of the start pointers and selects a start pointer present at a foremost address. For example, when the start pointer P3 corresponding to the variable length code sequence VLc is selected, the reading control unit 83 specifies an address positioned in front of the start pointer P3 by 4 [bits] of the reading interval as a position (hereinafter, referred to as a previously finished address) where the last data of the variable length code sequence VLc of which the decoded data generating process is finished.

The reading control unit 83 changes the reading interval to "3" after the previously finished address and then executes the decoded data generating process using the variable length decoding units 91, 92 and 94 corresponding to the variable length code sequences VLa, VLb and VLd again.

That is, the first variable length decoding unit 91 invalidates the decoded data generated after the decoded data (hereinafter, referred to as the previously finished decoded data) generated from the variable length code including repeated bits having the previously finished address of the variable length code sequence VLc. Then, the first variable length decoding unit 91 executes the decoded data generating process from the previously finished decoded data again.

For example, the first variable length decoding unit 91 executes the decoded data generating process from the $118^{th}$ time again, the second variable length decoding unit 92 executes the decoded data generating process from the $124^{th}$ time again, and the fourth variable length decoding unit 94 executes the decoded data generating process from the $127^{th}$ time again.

The decoding control unit 83 supplies the previously finished address information indicating the previously finished address of the variable length code sequence VLc to the variable length decoding units 91, 92 and 94. The variable length decoding units 91, 92 and 94 invalidate the previously finished decoded data and the decoded data generated subsequently.

For example, the first variable length decoding unit 91 invalidates the decoded data generated after the $118^{th}$ time, if the previously finished address of the variable length code sequence VLc is used for the decoded data generated based on the $118^{th}$ decoded data generating process of the variable length code sequence VLa. Similarly, the second variable length decoding unit 92 invalidates the decoded data generated after the $124^{th}$ decoded data generating process. The fourth variable length decoding unit 94 invalidates the decoded data generated after the $127^{th}$ decoded data generating process.

The variable length decoding units 91, 92 and 94 store the positions of the start pointers set at the time of the decoded data generating processes, respectively. The variable length decoding units 91, 92 and 94 return the start pointers to the positions set at the time of the decoded data generating process of generating the previously finished decoded data, respectively.

That is, the first variable length decoding unit 91 returns the start pointer P1 to the position of the $118^{th}$ decoded data generating process. The second variable length decoding unit 92 returns the start pointer P2 to the position of the $124^{th}$ decoded data generating process. The fourth variable length decoding unit 94 returns the start pointer P4 to the position of the $127^{th}$ decoded data generating process.

Then, the reading control unit 83 supplies reading interval information indicating that the reading interval is set to "4" up to the previously finished address and the reading interval is changed to "3" from the next repeated bits exceeding the previously finished address to the variable length decoding units 91, 92 and 94.

Figure 25A:
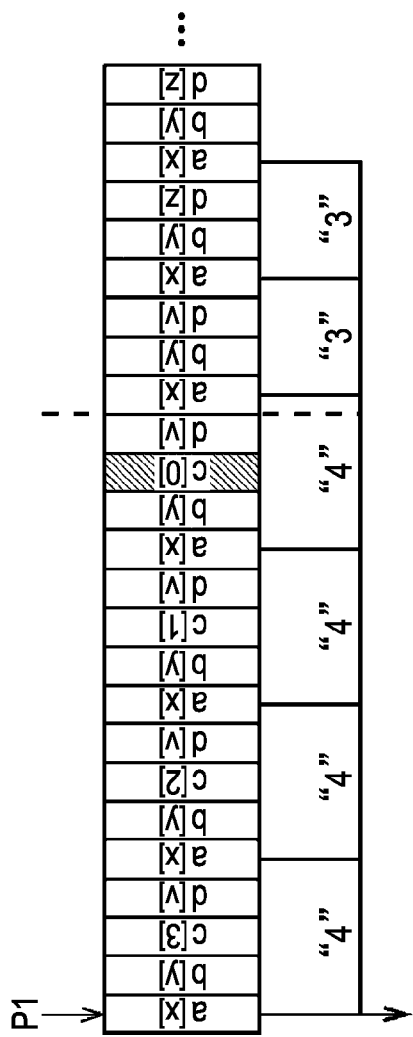
FIG. 25 is a schematic diagrammatic view provided for illustrating a termination process (1) according to the second embodiment of the present invention.
Figure 25B:
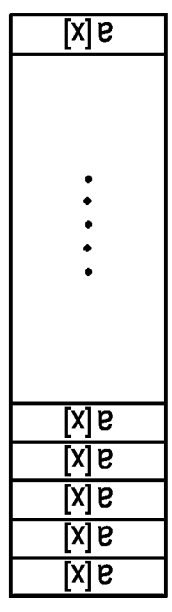

As shown in FIG. 25A, the first variable length decoding unit 91 reads data at an interval of 4 [bits] while the variable length code sequence VLc is present, but reads data at an interval of 3 [bits] after the variable length code sequence VLc is not present.

As a result, the first variable length decoding unit 91 may read only the variable length code sequence VLa as the bits to be decoded and generate the decoded data based on the variable length code sequence VLa.

Similarly, the variable length decoding units 92 and 94 execute the decoded data generating process again, from the decoded data generating process of generating the previously finished decoded data by the control of the reading control unit 83.

The number of times of the decoded data generating process of generating the previously finished decoded data is different according to the lengths of the variable length code sequences or the like. To this end, the number of times of the decoded data generating process executed again is different for each of the variable length decoding units 91, 92 and 94.

The first variable length decoding unit 91 executes 11 times of remaining decoded data generating process from the $118^{th}$ time. The second variable length decoding unit 92 executes 5 times of remaining decoded data generating processes from the $124^{th}$ time, and the fourth variable length decoding unit 94 executes 2 times of remaining decoded data generating processes from the $127^{th}$ time.

To this end, the fourth variable length decoding unit 94 finishes the $128^{th}$ decoded data generating process by two times of decoded data generating processes. At this time, the reading control unit 83 compares the last address of the variable length code sequence VLd with the start pointer P1 and the start pointer P2 respectively corresponding to the variable length decoding units 91 and 92.

Figure 25C:
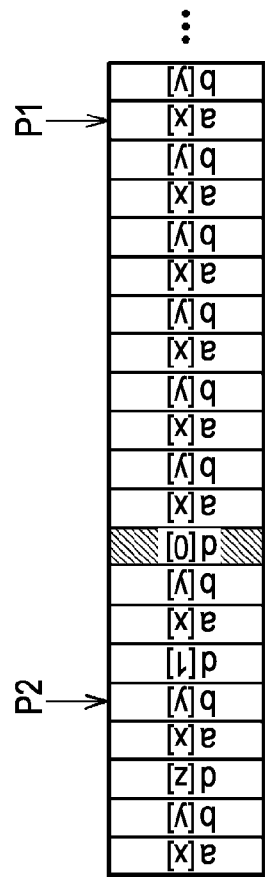

For example, as shown in FIG. 25C, if the start pointer P2 is present before the last address d[0] of the variable length code sequence VLd, the data of the variable length code sequence VLb may be finished earlier.

Accordingly, the reading control unit 83 enables the variable length decoding units 91 and 92 to continue to perform the decoded data generating process until both the start pointers P1 and P2 respectively corresponding to the different variable length decoding units 91 and 92 exceed the last address of the variable length code sequence VLd.

Figure 25D:
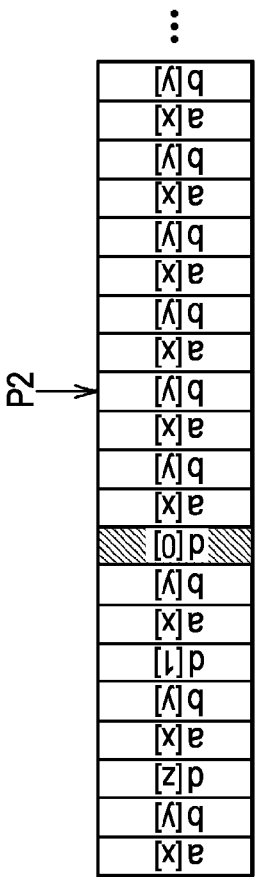

At this time, as shown in FIG. 25D, the reading control unit 83 recognizes the last address of the variable length code sequence VLd as the previously finished address, when both the start pointers P1 and P2 exceed the last address of the variable length code sequence VLd.

In addition, if the $128^{th}$ decoded data generating process is finished in a state in which any one of the start pointers P1 and P2 does not exceed the last address of the variable length code sequence VLd, the reading control unit 83 specifies the last address of the variable length code sequence finished before as the previously finished address.

Figure 26A:
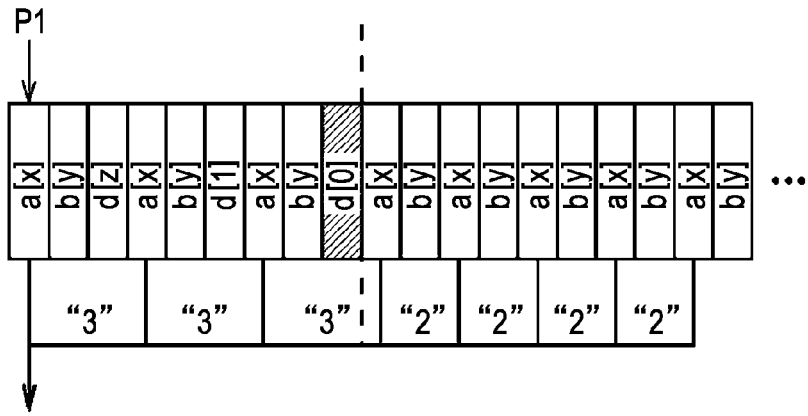
FIG. 26 is a schematic diagrammatic view provided for illustrating a termination process (2) according to the second embodiment of the present invention.
Figure 26B:
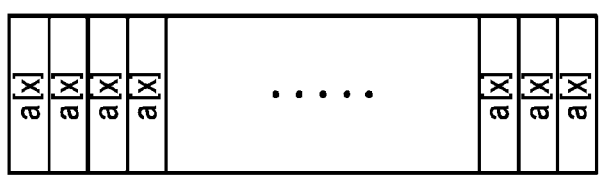

As shown in FIGS. 26A and 26B, the first variable length decoding unit 91 moves the start pointer P1 up to the position of the decoded data generating process of generating the previously finished decoded data by the control of the reading control unit 83. In addition, the variable length decoding unit 91 invalidates the decoded data after the previously finished decoded data, changes the reading interval of the repeated bits after the previously finished address to "2", and continues to perform the decoded data generating process. The same is true with respect to the second variable length decoding unit 92.

Figure 26C:
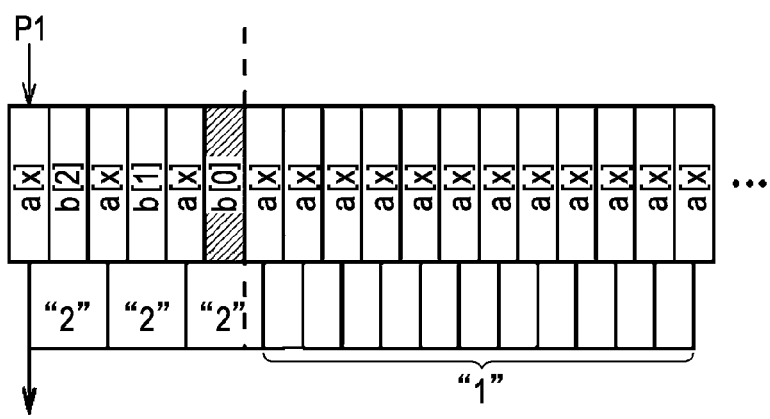
Figure 26D:
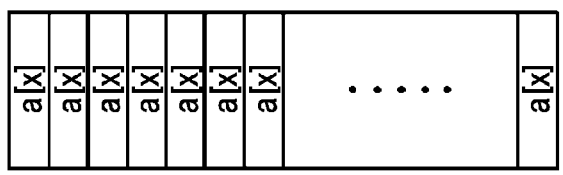

As shown in FIGS. 26C and 26D, the reading control unit 83 similarly specifies the previously finished address, when the $128^{th}$ decoded data generating process using the second variable length decoding unit 92 is finished. In addition, the first variable length decoding unit 91 moves the start pointer P1 up to the position of the decoded data generating process of the previously finished decoded data by the control of the reading control unit 83. In addition, the variable length decoding unit 91 invalidates the decoded data after the previously finished decoded data, changes the reading interval of the repeated bits after the previously finished address to "1", and continues to perform the decoded data generating process.

The reading control unit 83 recognizes the last bit of the variable length code sequence VLa as the last bit of the nested block VLy from the reading interval of "1", if the 128$^{th}$ decoded data generating process using the first variable length decoding unit 91 is finished. The reading control unit 83 finishes the parallel decoding process of the nested block VLy and, at the same time, starts the process of a next nested block VLy.

The decoder 80 reads the bit stream BSr composed of the plurality of variable length code sequences VL in the nested shape for each of the variable length code sequences VLa to VLd. Therefore, the decoder 80 can simultaneously decode the plurality of variable length code sequences VLa to VLd so as to generate plural pieces of decoded data and perform the variable length decoding process at a high speed.

2-3. Detailed Processing Procedure 2-3-1. Encoding Procedure

Figure 27:
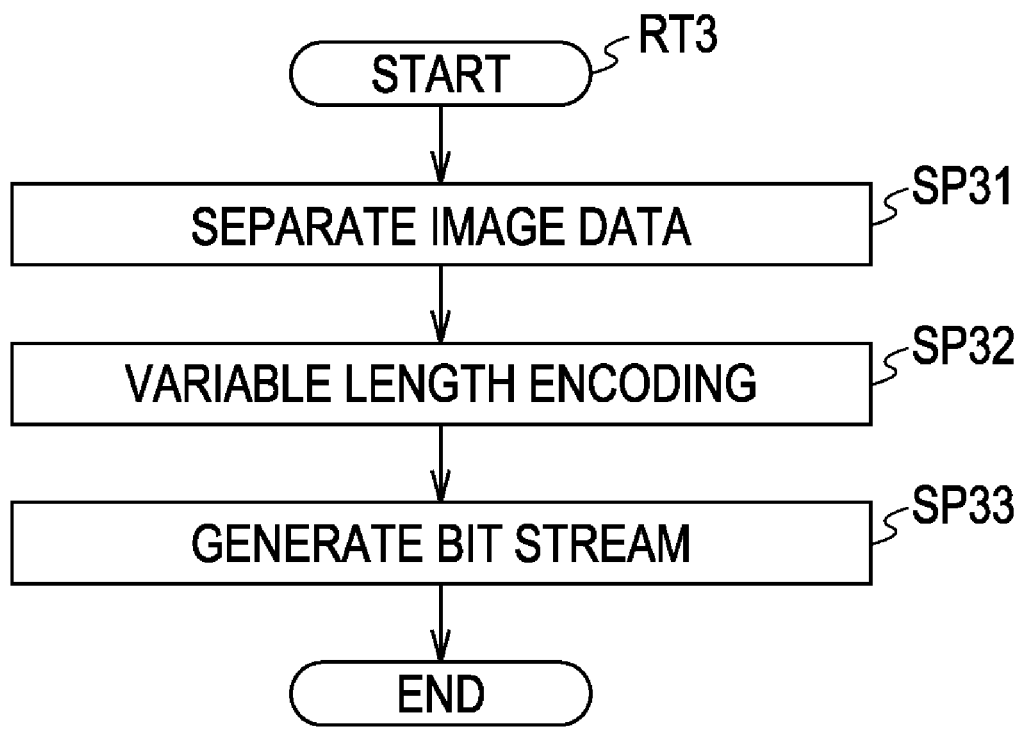
FIG. 27 is a flowchart provided for illustrating an encoding process order according to the second embodiment of the present invention.

Next, an encoding procedure RT3 executed according to an encoding program will be described using the flowchart of FIG. 27.

When the image data BL is supplied, the encoder 50 starts the encoding procedure RT3 and moves to step SP31.

In step SP31, the encoder 50 separates the image data BL into data blocks DB which are processing block units and then moves to next step SP32.

In step SP32, the encoder 50 variable-length-encodes the image data BL in the separated units (that is, the data blocks DB) so as to generate the plurality of variable length code sequences VLa to VLd, and then moves to next step SP33.

In step SP33, the encoder 50 arranges the plurality of variable length code sequences VLa to VLd 1 [bit] by 1 [bit] in the nested shape so as to generate a nested block VLy. The encoder [50] couples the newly generated nested block VLy to the previously generated nested block VLy so as to generate the bit stream BSr, and moves to an end step and finishes the encoding procedure RT3.

2-3-2. Parallel Decoding Procedure

Figure 28:
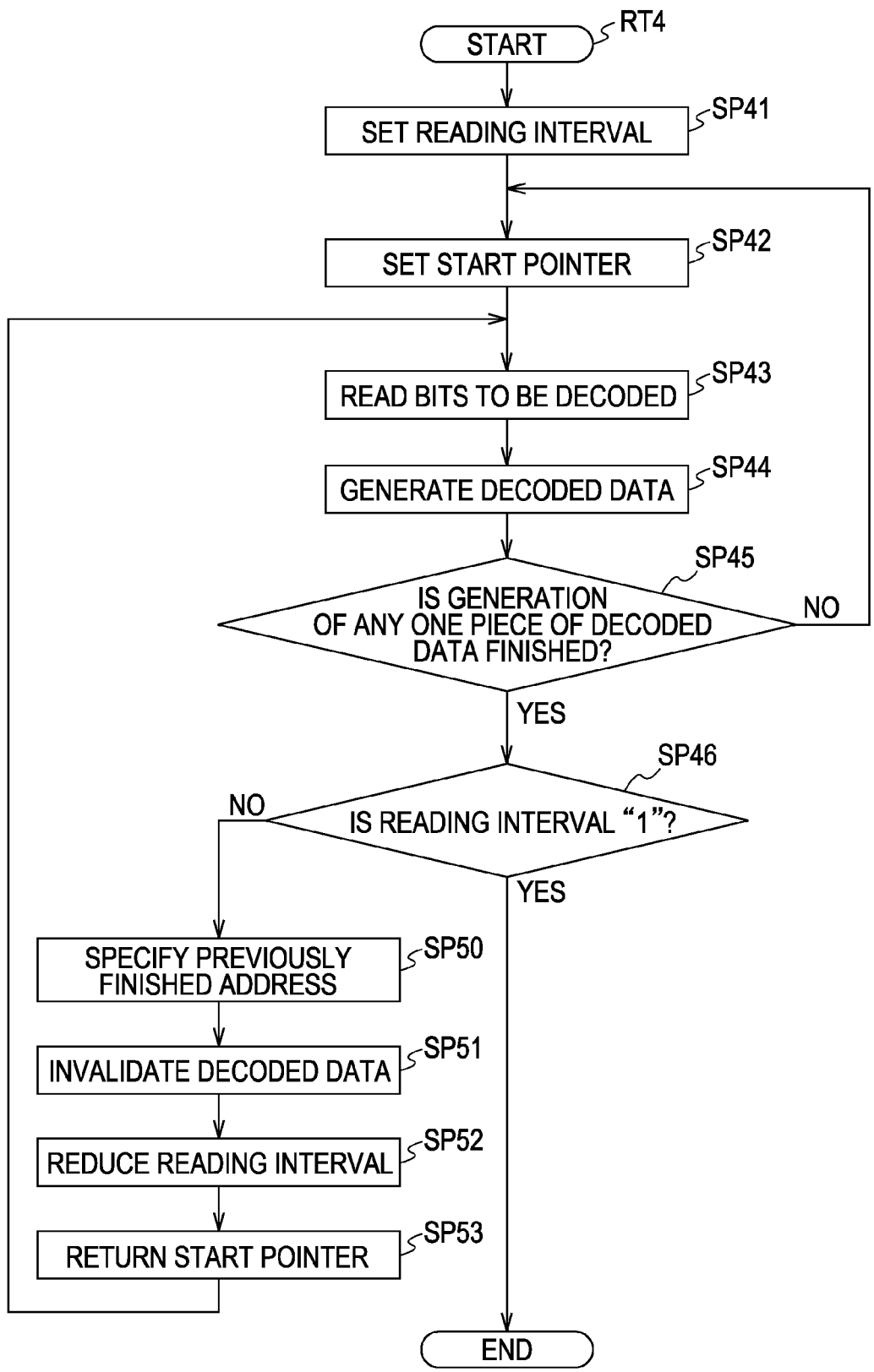
FIG. 28 is a flowchart provided for illustrating a parallel decoding process order according to the second embodiment of the present invention.

Next, a parallel decoding procedure RT4 executed according to a parallel decoding program will be described using the flowchart of FIG. 28.

When the bit stream BSr is supplied, the decoder 80 starts the parallel decoding procedure RT4, sequentially stores the supplied bit stream BSr in the memory 82, and moves to next step SP41.

In step SP41, the decoder 80 sets the number of variable length code sequences VL configuring the nested block VLy at the reading interval and then moves to next step SP42.

In step SP42, the decoder 80 sets the decoding start position based on the start end of the nested block VLy to be processed in the memory 82 and then moves to step SP43.

That is, the decoder 80 determines the leading bit of the nested block VLy as the decoding start position of the first variable length decoding unit 91 and sets the start pointer P1. In addition, the decoder 80 determines the second, third and fourth bits of the nested block VLy as the decoding start positions of the variable length decoding units 92, 93 and 94 and sets the start pointers P2, P3 and P4.

In step SP43, the decoder 80 reads the data at the reading interval from the start pointers by the variable length decoding units 91 to 94, sets it as the bits to be decoded, and then moves to step SP44.

In step SP44, the decoder 80 generates the decoded data by referring to the VLD table from the bits to be decoded by the variable length decoding units 91 to 94 and then moves to step SP45.

In step SP45, the decoder 80 determines whether the decoded data generating process of several variable length decoding units 91 to 94 is finished and returns to step SP42 if a negative result is obtained.

In step SP42, the decoder 80 moves the start pointer by the number of bits to be decoded, which are used for generating the decoded data in step SP44, and then moves to step SP43 so as to continue to perform the process.

In contrast, if a positive result is obtained in step SP45, it is indicated that the recording interval of the nested block VLy may be changed. At this time, the decoder 80 moves to next step SP46.

In step SP46, the decoder 80 determines whether the recording interval is "1". Here, if a negative result is obtained, it is indicated that the recording interval is changed and thus the decoded data is incorrectly generated. At this time, the decoder 80 moves to next step SP50.

In step SP50, the decoder 80 specifies the previously finished address indicating the address of the variable length code sequence of which the decoded data generating process is finished at a foremost address and then moves to step SP51.

In step SP51, the decoder 80 invalidates the previously finished decoded data, which is the decoded data generated from the variable length code having the repeated bits including the previously finished address, and the subsequent decoded data and then moves to next step SP52.

In step SP52, the decoder 80 reduces the reading interval from the next bit of the repeated bits, to which the previously finished address belongs, by "1", sets the reading interval and moves to next step SP53.

In step SP53, the decoder 80 returns the start pointer to the position where the decoding process of the previously finished decoded data is executed, returns to next step SP43, and continues to perform the decoded data generating process of the remaining variable length code sequences.

In contrast, if a positive result is obtained in step SP46, it is indicated that the decoded data generating process using all the variable length decoding units 91 to 94 is finished and the nested block VLy is generated. At this time, the decoder 80 connects the newly generated nested block VLy to the previously generated nested block VLy so as to generate image data BL, moves to an end step, and finishes the parallel decoding procedure RT4.

2-4. Operation and Effect

In the above-described configuration, the encoder 50 separates the image data BL into the data blocks DBa to DBd which are the plurality of data blocks, variable-length-encodes the data blocks DBa to DBd, and generates the plurality of variable length code sequences VLa to VLd. The encoder 50 generates the bit stream BSr in which data based on the plurality of variable length code sequences VLa to VLd is arranged in the nested shape.

Accordingly, the encoder 50 can arrange the data based on the variable length code sequences VLa to VLd in parallel in one nested block VLy of the bit stream BSr.

The encoder 50 arranges the data based on the variable length code sequences, of which the arrangement of the data is not finished, in the nested shape, if the arrangement of the data based on the variable length code sequence having a short code length of the plurality of variable length code sequences VLa to VLd is finished.

Accordingly, since the encoder 50 can generate the bit stream BSr from just the data based on the variable length code sequences VLa to VLd, the code amount is not increased due to addition of dummy data or the like.

The encoder 50 arranges the data based on the plurality of code length fixed block VLx 1 [bit] by 1 [bit], which is an extraction number, in the nested shape.

Here, if the encoder sets the extraction number to be plural, dummy data for holding the extraction number is added when the arrangement of the data based on the code length fixed block VLx is finished and thus the code amount may be increased.

The encoder 50 sets the extraction number to "1" so as to suppress the code amount from being increased without adding the dummy data.

The decoder 80 reads the data from the bit stream BSR in which the data based on the plurality of variable length code sequences VLa to VLd composed of the variable length codes is arranged in the nested shape, for each of the variable length code sequences VLa to VLd. The decoder 80 variable-length-decodes the plurality of variable length code sequences VLa to VLd in parallel so as to generate the decoded data.

Accordingly, since the decoder 80 can variable-length-decode the plurality of variable length code sequences VLa to VLd in parallel, it is possible to perform the variable length decoding process at a high speed.

The decoder 80 reads the data at the same reading interval as the recording interval of each of the variable length code sequences VLa to VLd of the data arranged in the bit stream BSr so as to read the data as the bits to be decoded for each of the variable length code sequences VLa to VLd.

Accordingly, the decoder 80 can execute the decoded data generating process for each of the variable length code sequences VLa to VLd and thus can variable-length-decode the plurality of variable length code sequences VLa to VLd in parallel.

The decoder 80 arranges the data based on the variable length code sequences, of which the arrangement of the data is not finished, in the nested shape so as to variable-length-decode the bit stream BSr of which the recording interval is changed for each of the variable length code sequences, if the arrangement of the data based on the variable length code sequence having the short code length of the plurality of variable length code sequences VLa to VLd is finished.

The decoder 80 specifies the previously finished address which is the last position of the variable length code sequence of which the reading is finished, if the reading of the data based on the variable length code sequence having the short code length of the bit stream BSr is finished. The decoder 80 reads the variable-length-decoded variable length code again using bits subsequent to the repeated bits, to which the previously finished address belongs, if the repeated bits in which the data based on all the variable length code sequences arranged at the previously finished address is briefly arranged. The decoder 80 variable-length-decodes again the variable length code already read.

Accordingly, the decoder 80 can variable-length-decode again the variable length code which may be wrongly variable-length-decoded by a variation in recording interval. To this end, the decoder 80 can accurately perform variable length decoding to the end without wrongly variable length decoding the plurality of variable length code sequences VLa to VLd.

According to the above-described configuration, the encoder 50 generates the bit stream BSr by extracting and sequentially arranging the data of the variable length code sequences VLa to VLd generated for each code unit 1 [bit] by 1[bit], which is the extraction number.

To this end, the encoder 50 can generate the bit stream BSr such that the data of the variable length code sequences VLa to VLd is arranged at the recording interval.

Since the decoder 80 can read the generated bit stream BSr at the same reading interval as the recording interval and can read the bits to be decoded for each of the variable length code sequences VLa to VLd, it is possible to execute the decoded data generating process in parallel.

Accordingly, the present invention can realize an encoder, an encoding method and a recording medium having an encoding program recorded thereon, a decoder, a decoding method and a recording medium having a decoding program recorded thereon, which are capable of performing a variable length decoding process at a high speed.

3. Third Embodiment

FIGS. 29 to 36 show a third embodiment, in which portions corresponding to those of the second embodiment shown in FIGS. 16 to 28 are denoted by the same reference numerals. The third embodiment is different from the second embodiment in that each of 4 separated data blocks DBa to DBd is separated into a first half and a second half so as to generate a total of 8 variable length code sequences such that a code length fixed block VLx is generated.

3-1. Configuration of Encoder

As shown in FIG. 29, an encoder 100 of the third embodiment executes an encoding process with respect to image data so as to generate and output a bit stream BSx, when the image data BL is supplied.

In detail, when the image data BL is supplied through an input terminal 101, the encoder 100 supplies the image data BL to a separation unit 102.

As shown in FIG. 30, the separation unit 102 separates the image data BL into data blocks DBa to DBd similar to the second embodiment. In addition, the separation unit 102 bisects the data blocks DBa to DBd such that luminance data or color difference data is divided 64 bits by 64 bits so as to generate first half data blocks DBa1 to DBd1 and second half data blocks DBa2 to DBd2. The separation unit 102 supplies them to variable length encoding units 111 to 118, respectively.

The first variable length encoding unit 111 variable-length-encodes the second half data block DBa1 supplied from the separation unit 102, generates first half variable length code sequence VLa1 (FIG. 30B), and supplies it to a first coupling unit 131.

The second variable length encoding unit 112 variable-length-encodes the first half data block DBa2 supplied from the separation unit 102, generates second half variable length code sequence VLa2 (FIG. 30B), and supplies it to a first mirror processing unit 121.

The first mirror processing unit 121 rearranges the second half variable length code sequence VLa2, performs mirror processing, and supplies the mirror-processed code sequence to the first coupling unit 131.

The first coupling unit 131 couples the first half data block DBa and the mirror-processed second half variable length code sequence VLa2 by inserting buffer data DD therebetween, if necessary, and generates a code length fixed block VXa having a fixed code length. In addition, the first coupling unit 131 adjusts the code length such that the total code length of the first half data block DBa and the mirror-processed second half variable length code sequence VLa2 is equal to or less than the fixed code length.

A third variable length encoding unit 113, a fourth variable length encoding unit 114, a second mirror processing unit 122 and a second coupling unit 132 perform the same processes with respect to the supplied first half block data DBb1 and the second half block data DBb2, and generate a code length fixed block VXb.

A fifth variable length encoding unit 115, a sixth variable length encoding unit 116, a third mirror processing unit 123 and a third coupling unit 133 perform the same processes with respect to the supplied first half block data DBc1 and the second half block data DBc2, and generate a code length fixed block VXc.

A seventh variable length encoding unit 117, an eighth variable length encoding unit 118, a fourth mirror processing unit 124 and a fourth coupling unit 134 perform the same processes with respect to the supplied first half block data DBd1 and the second half block data DBd2, and generate a code length fixed block VXd.

Figures 31A, 31B, 31C, 31D, 31E:
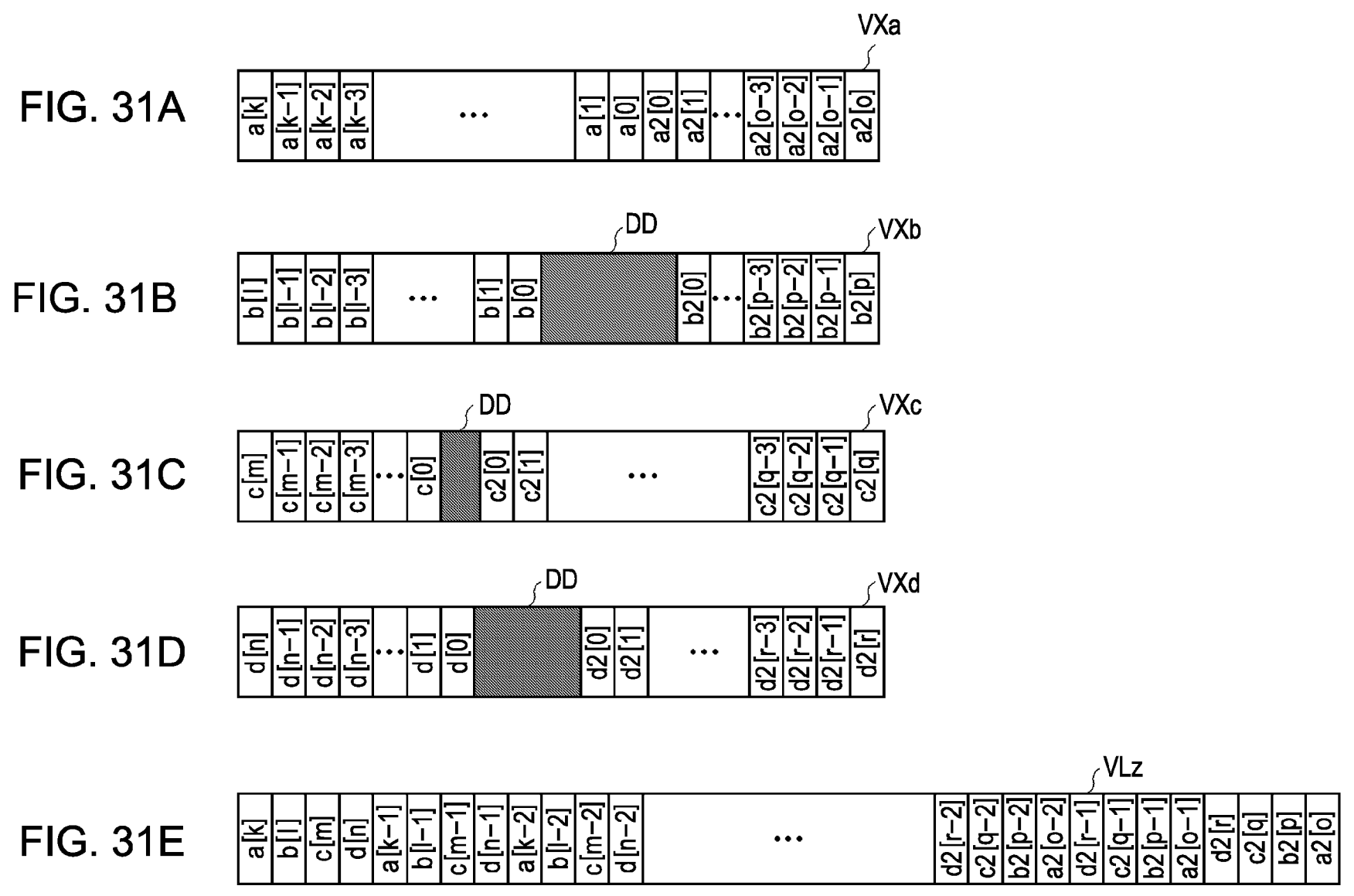

As shown in FIG. 31, a bit stream generation unit 104 arranges data in a nested shape 1 [bit] by 1 [bit] from leading bits of the code length fixed blocks VXa to VXd so as to generate a nested block VLz.

As a result, in the nested block VLz, the data corresponding to the first half variable length code sequences VLa1, VLb1, VLc1 and VLd1 from the start end in the normal direction in the nested shape. In the nested block VLz, the data corresponding to the second half variable length code sequences VLa2, VLb2, VLc2 and VLd2 from the termination end in the reverse direction in the nested shape.

The bit stream generation unit 104 sequentially arranges the nested block VLz so as to generate the bit stream BSx.

The encoder 100 generates the plurality of code length fixed blocks VXa to VXd and arranges the data of the plurality of code length fixed blocks VXa to VXd in the nested shape so as to generate the bit stream BSx.

To this end, in the bit stream BSx, the data corresponding to the plurality of code length fixed blocks VXa to VXd is repeatedly arranged from the start end and the termination end in opposite directions. In addition, in the bit stream BSx, the code length of the nested block VLz can be made constant.

3-2. Configuration of Decoder

Figure 32:
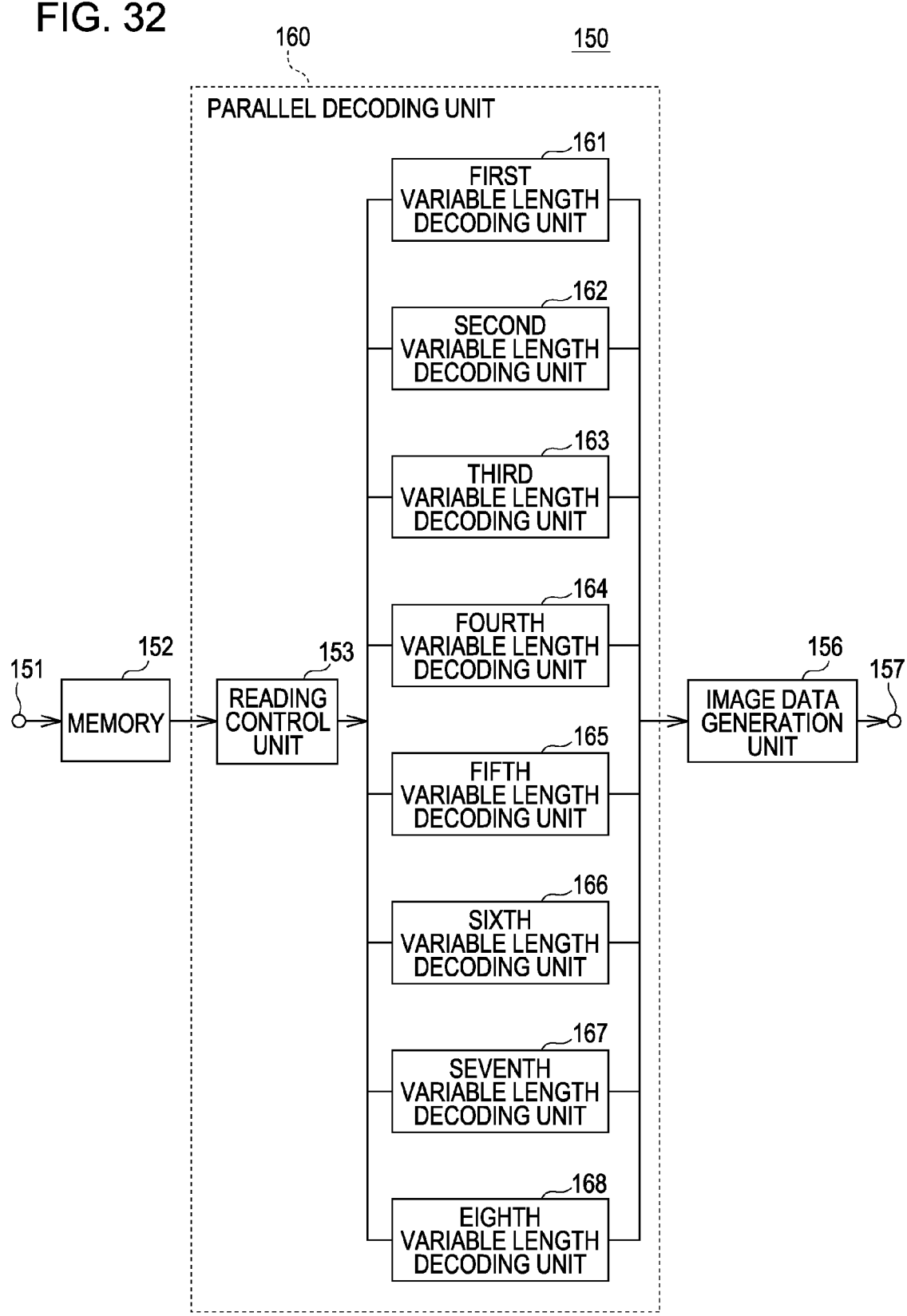
FIG. 32 is a schematic diagrammatic view showing the configuration of a decoder according to the third embodiment of the present invention.

As shown in FIG. 32, when the bit stream BSx is supplied, a decoder 150 according to the third embodiment executes a parallel decoding process as a variable length decoding process so as to generate image data BL.

In detail, when the bit stream BSx composed of the nested block VLz is supplied, the decoder 150 supplies it to a memory 152. The memory 152 sequentially stores the supplied nested block VLz.

Figure 33:
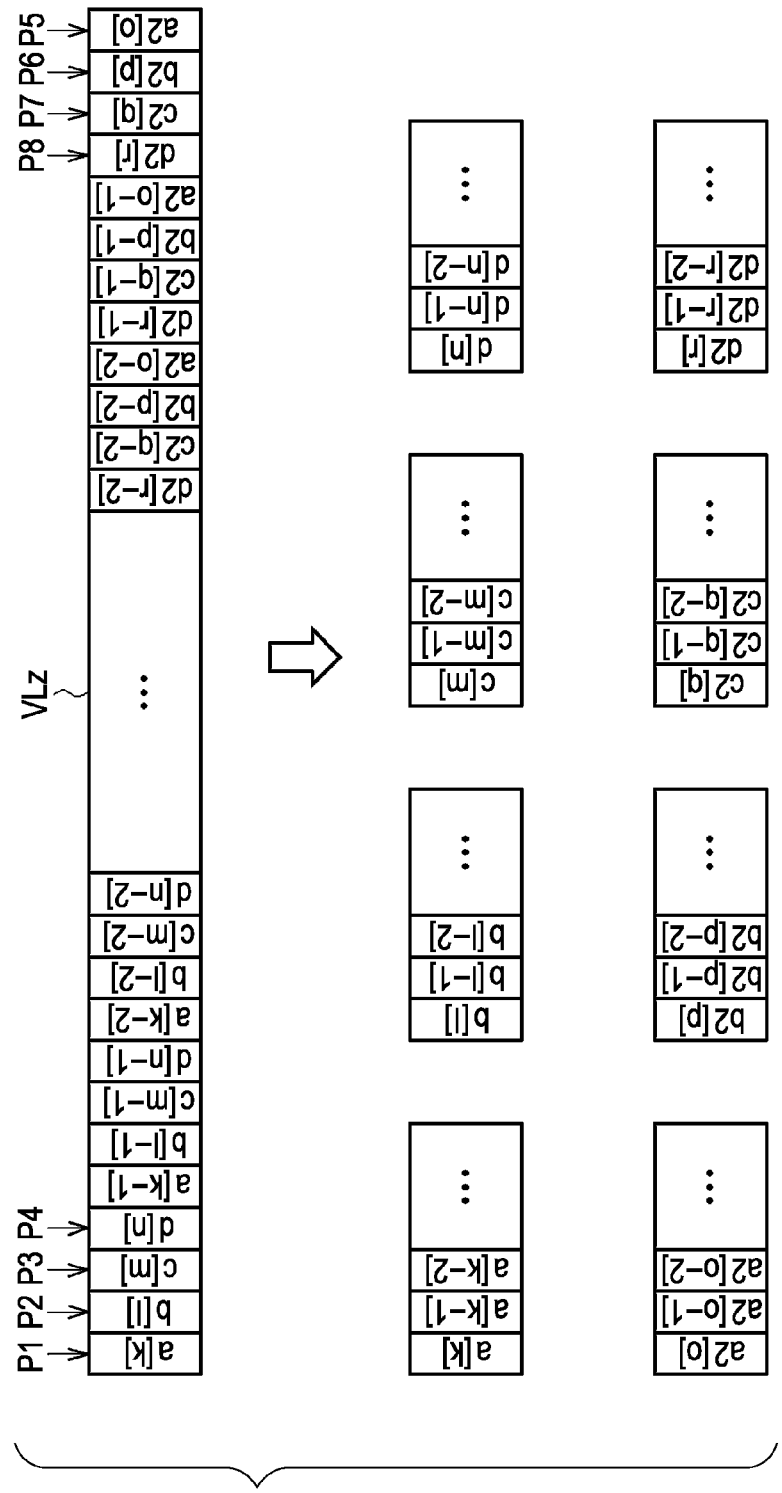
FIG. 33 is a schematic diagrammatic view provided for illustrating reading of bits to be decoded according to the third embodiment of the present invention.

As shown in FIG. 33, a reading control unit 153 specifies a decoding start position from the code length of the nested block VLz and sets start pointers P1 to P4 at the decoding start position. That is, the reading control unit 153 sets the start pointer P1 corresponding to a first variable length decoding unit 161 to a leading bit of the nested block VLz. In addition, the reading control unit 153 sets the start pointers P2 to P4 respectively corresponding to variable length decoding units 162 to 164 from the leading bit of the nested block VLz in the normal direction to a $2^{nd}$ [bit], a $3^{rd}$ [bit] and a $4^{th}$ [bit], respectively.

The reading control unit 153 reads data from the start pointers P1 to P4 at an interval of 4 [bits] in the normal direction, reads bits to be decoded, supplies them to the variable length decoding units 161 to 164.

When information about the number of bits used for generating decoded data is received from the variable length decoding units 161 to 164, the reading control unit 153 moves the start pointers P1 to P4 by the number of bits used for generating the decoded data in the normal direction. The reading control unit 153 reads data from the start pointers P1 to P4 at an interval of 4 [bits], reads bits to be decoded, and supplies them to the variable length decoding units 161 to 164.

To this end, the variable length decoding units 161 to 164 can execute the decoded data generating process of reading and variable-length-decoding the bits to be decoded in parallel.

The reading control unit 153 specifies a decoding start position from the code length of the nested block VLz having a fixed length and sets start pointers P5 to P8 at the decoding start position. That is, the reading control unit 153 sets the start pointer P5 corresponding to a fifth variable length decoding unit 165 to a backmost bit of the nested block VLz. In addition, the reading control unit 153 sets the start pointers P6 to P8 respectively corresponding to variable length decoding units 166 to 168 from the backmost bit of the nested block VLz in the reverse direction to a $2^{nd}$ [bit], a $3^{rd}$ [bit] and a $4^{th}$ [bit], respectively.

The reading control unit 153 reads data from the start pointers P5 to P8 at an interval of 4 [bits] in the reverse direction, reads bits to be decoded, supplies them to the variable length decoding units 165 to 168.

When information about the number of bits used for generating decoded data is received from the variable length decoding units 165 to 168, the reading control unit 153 moves the start pointers P5 to P8 by the number of bits used for generating the decoded data in the reverse direction. The reading control unit 153 reads data from the start pointers P5 to P8 at an interval of 4 [bits], reads bits to be decoded, and supplies them to the variable length decoding units 165 to 168.

To this end, the variable length decoding units 165 to 168 execute the decoded data generating process in parallel, respectively generate the data blocks BBa1, BBa2, BBb1, BBb2, BBc1, BBc2, BBd1 and BBd2, and supply them to an image data generation unit 154.

Figure 34:
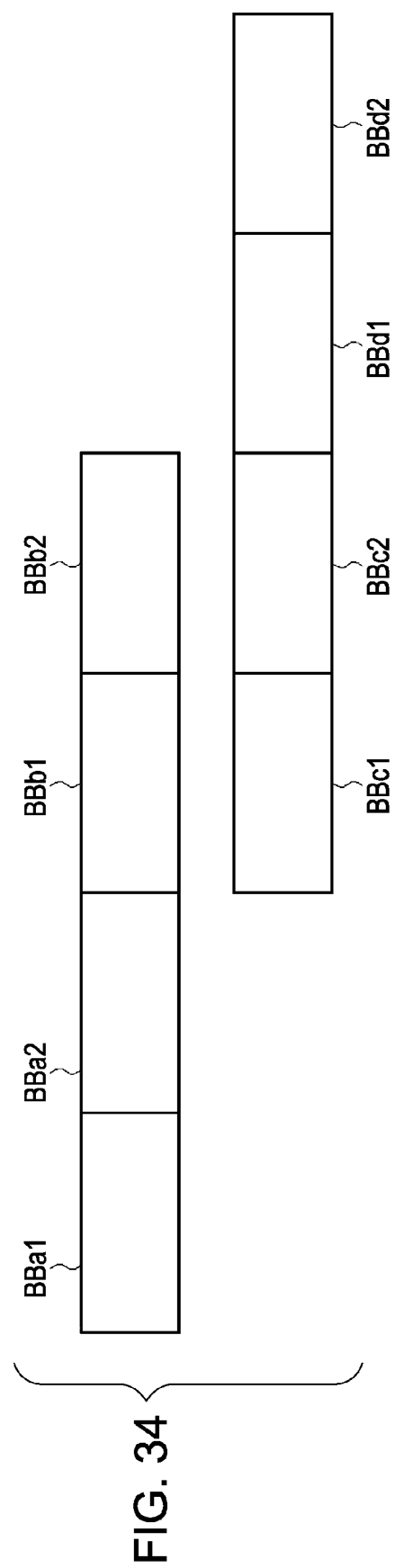
FIG. 34 is a schematic diagrammatic view provided for illustrating generation of image data according to the third embodiment of the present invention.

As shown in FIG. 34, the image data generation unit 154 connects the data blocks BBa1, BBa2, BBb1, BBb2, BBc1, BBc2, BBd1 and BBd2 so as to generate decoded blocks. The image data generation unit 154 further connects the decoded blocks so as to generate the image data BL.

The decoder 150 reads and variable-length-decodes the data arranged in the nested shape from both the start end and the termination end of the nested block VLz in parallel.

To this end, since the decoder 150 can simultaneously execute the decoded data generating process in parallel, it is possible to perform a variable length decoding process at a high speed.

3-3. Detailed Procedure 3-3-1. Encoding Procedure

Figure 35:
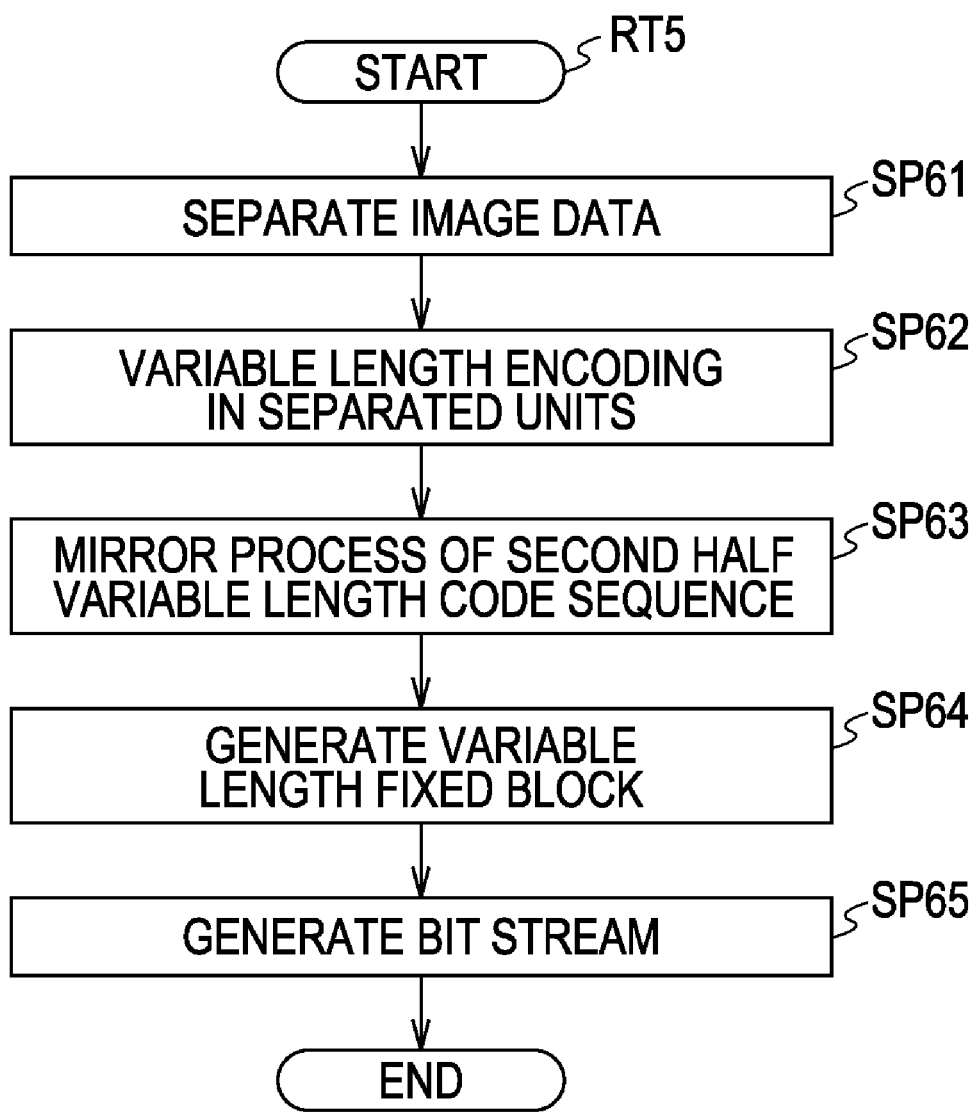
FIG. 35 is a flowchart provided for illustrating an encoding process order according to the third embodiment of the present invention.

Next, an encoding procedure RT5 executed according to an encoding program will be described using the flowchart of FIG. 35.

When the image data BL is supplied, the encoder 100 starts the encoding procedure RT5 and moves to step SP61.

In step SP61, the encoder 100 separates the image data BL into the first half data blocks DBa1 to DBd1 and the second half data block DBa2 to DBd2 and then moves to next step SP62.

In step SP62, the encoder 100 variable-length-encodes the image data BL in the separated units so as to generate the first half variable length code sequences VLa1 to VLd1 and the second half variable length code sequences VLa2 to VLd2, and then moves to next step SP63.

In step SP63, the encoder 100 executes mirror processing with respect to the second half variable length code sequences VLa2 to VLd2 and then moves to next step SP64.

In step SP64, the encoder 100 couples the first half variable length code sequence VLa and the second half mirror variable length code sequence VLm by inserting the buffer data DD therebetween so as to generate the code length fixed blocks VLxa to VLxd having the fixed code length, and then moves to next step SP65.

In step SP65, the encoder 100 extracts data from the code length fixed blocks VXa to Vxd 1 [bit] by 1 [bit] and arranges the data in the nested shape so as to generate a nested block VLz. Then, the encoder 100 arranges the nested block VLz so as to generate the bit stream BSx, and then moves to an end step so as to finish the encoding procedure RT5.

3-3-2. Parallel Decoding Procedure

Figure 36:
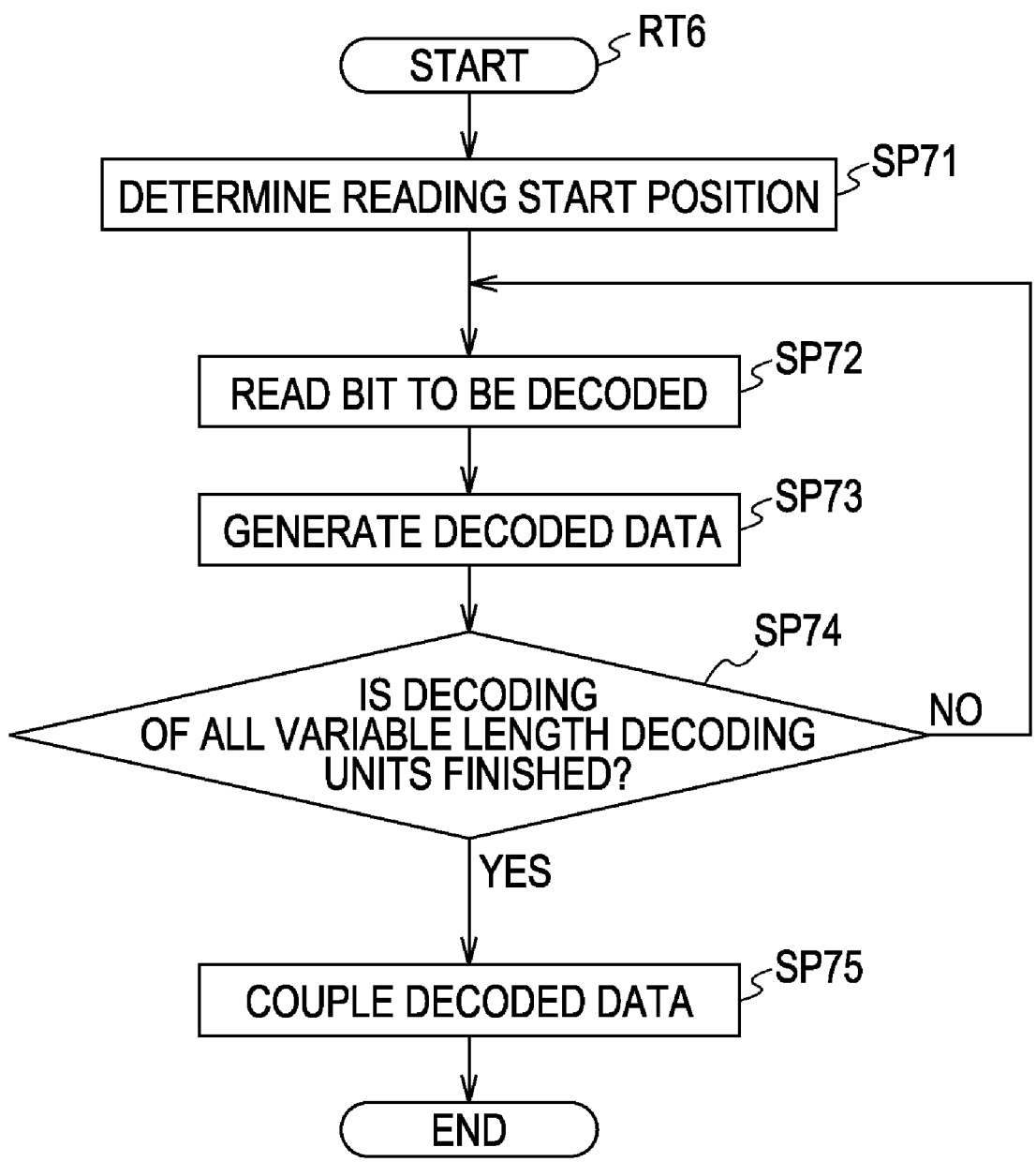
FIG. 36 is a flowchart provided for illustrating a parallel decoding process order according to the third embodiment of the present invention.

Next, a parallel decoding procedure RT6 executed according to a parallel decoding program will be described using the flowchart of FIG. 36.

When the bit stream BSx is supplied, the decoder 150 starts the parallel decoding procedure RT6, sequentially stores the supplied bit stream BSx in the memory 152, and moves to next step SP71.

In step SP71, the decoder 150 sets the decoding start position based on the start end and the termination end of the nested block VLz to be processed in the memory 152 and moves to next step SP72.

That is, the decoder 150 determines the start end of the nested block VLz and a $2^{nd}$ [bit], a $3^{rd}$ [bit] and $4^{th}$ [bit] from the start ends as the decoding start positions of the variable length decoding units 161 to 164 and sets the start pointers P1 to P4. In addition, the decoder 150 determines a $2^{nd}$ [bit], a $3^{rd}$ [bit] and $4^{th}$ [bit] from the termination end of the nested block VLz as the decoding start positions of the variable length decoding units 165 to 168, sets the start pointers P5 to P8.

In step SP72, the decoder 150 reads the data from the memory 152 in the normal direction from the start pointers P1 to P4 and in the reverse direction from the start pointers P5 to P8 so as to read sequentially the bits to be decoded, and then moves to next step SP73.

In step SP73, the decoder 150 generates the decoded data from the bits to be decoded and then moves to next step SP74.

In step SP74, the decoder 150 determines whether the generation of the decoded data of the nested block VLz to be processed is finished in all the variable length decoding units 161 to 168.

If a negative result is obtained, it is indicated that a variable length code to be variable-length-decoded is present in the nested block VLz. At this time, the decoder 150 returns to step SP72, starts the reading of the bits to be decoded from the position obtained by moving the start pointers P1 to P8 by the number of bits to be decoded used for generating the decoded data in step SP73, and continues to perform the processing.

In contrast, if a positive result is obtained in step SP74, the decoder 150 moves to next step SP75. In step SP75, the decoder 150 couples the first half decoded data BBa1 to BBd1 and the second half decoded data BBa2 to BBd2 so as to generate the nested block VLz. Then, the decoder 150 arranges the nested block VLz so as to generate the image data BL, and then moves to an end step so as to finish the parallel decoding process.

3-4. Operation and Effect

In the above-described configuration, the encoder 100 generates the plurality of code length fixed blocks VLx which are code blocks generated by combining the first half variable length code sequences VLa1 to VLd1 and the second half variable length code sequences VLa2 to VLd2. The encoder 100 arranges the data based on the plurality of code length fixed blocks VXa to VXd in the nested shape so as to generate the nested block VLz, and arranges the nested block VLz so as to generate the bit stream BSx.

To this end, the encoder 100 can execute the decoded data generating process in parallel with respect to the data of the code length fixed blocks VXa to VXd from the start end and the termination end of the nested block VLz.

In addition, the encoder 100 generates two variable length code sequences such that the total code length of the first half variable length code sequence VLa1 and the second half variable length code sequence VLa2, which are the two variable length code sequences, is equal to or less than the fixed length.

To this end, the encoder 100 can ease the limit of the code length, compared with the case where the first half variable length code sequence VLa1 and the second half variable length code sequence VLa2 are generated such that the code length of each of the first half variable length code sequence VLa1 and the second half variable length code sequence VLa2 is equal to or less than a predetermined fixed length. As a result, the encoder 100 can set the fixed length to be small so as to reduce the code amount or suppress deterioration of image quality due to adjustment of the code amount.

The decoder 150 reads the data of the code length fixed blocks VXa to VXd from the bit stream BSx in which the data based on the plurality of code length fixed blocks VXa to VXd is arranged in the nested shape so as to variable-length-decode the plurality of code length fixed blocks VXa to VXd in parallel.

To this end, since the decoder 150 can execute the decoded data generating process from the start end and the termination end of the nested block VLz, it is possible to increase the number of decoded data generating processes executed in parallel although the number of nested code length fixed blocks VXa to VXd is not increased. As a result, the decoder 150 can perform the parallel decoding process at a high speed as the variable length decoding process.

According to the above configuration, the encoder 100 combines two variable length code sequences so as to generate the plurality of code length fixed blocks VXa to VXd having the fixed length, extracting and sequentially arranges the data based on the code length fixed blocks VXa to VXd by the extraction number, and generates the nested block VLz.

To this end, the encoder 100 can generate the nested block VLz such that the leading bits of the first half variable length code sequences VLa1 to VLd1 are sequentially arranged on the start end and the second half variable length code sequences VLa2 to VLd2 are sequentially arranged on the termination end.

The decoder 150 reads the data based on the plurality of variable length code sequences for each variable length code sequence from the start end and the termination end of the generated nested block VLz so as to execute the decoded data generating process.

To this end, the decoder 150 can increase the number of decoded data generating processes executed in parallel and perform the parallel decoding process at a high speed.

4. Other Embodiments

Figure 37:
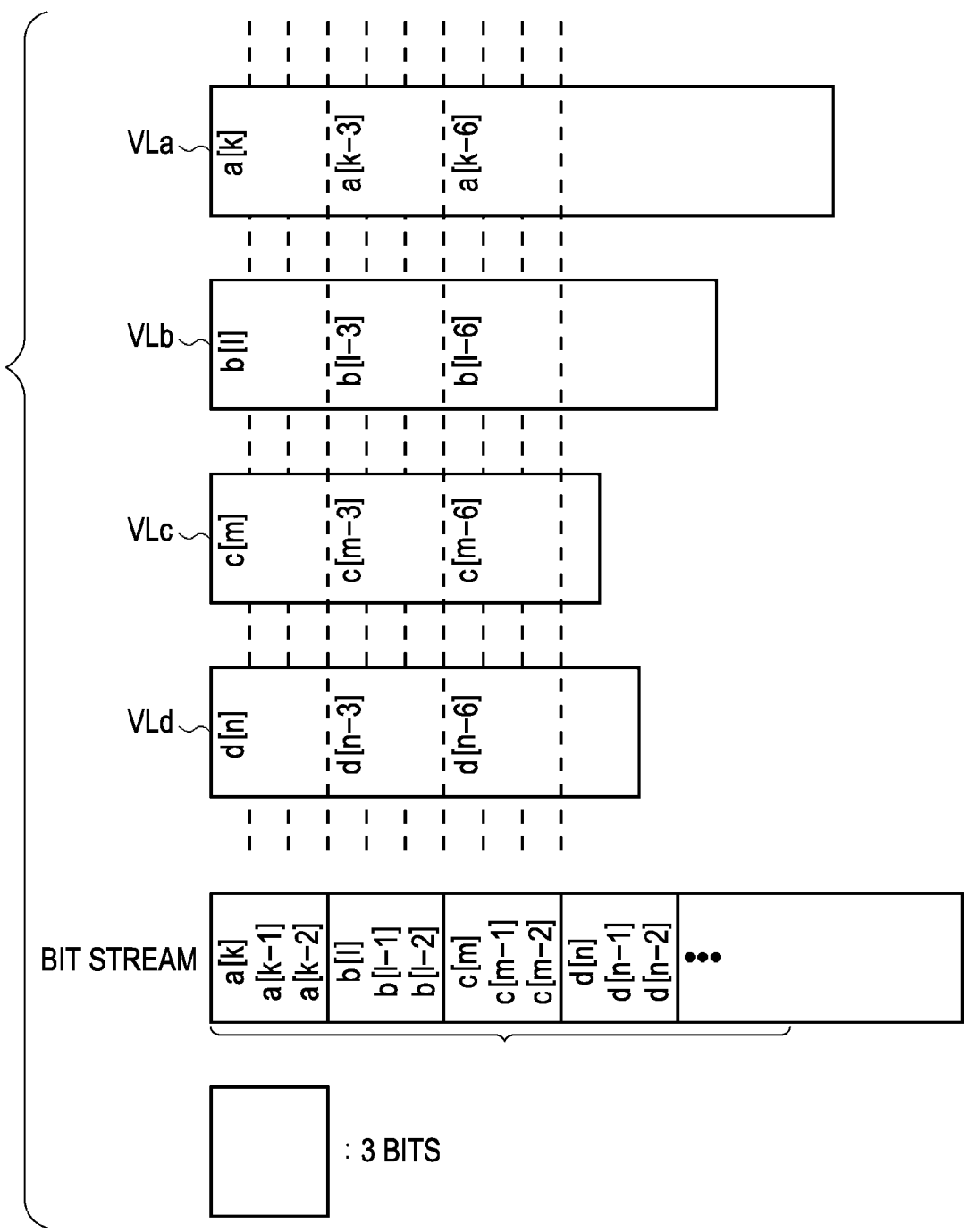
FIG. 37 is a schematic diagrammatic view provided for illustrating generation (1) of a bit stream according to the other embodiments of the present invention.

In addition, in the above-described second embodiment, the case where the extraction number is set to "1" and the data based on the variable length code sequences VLa to VLd is arranged in the nested shape 1 [bit] by 1 [bit] was described. The present invention is not limited thereto and the extraction number is not limited. For example, as shown in FIG. 37, the extraction number may be set to "3" and the data based on the variable length code sequences VLa to VLd may be arranged in the nested shape 3 [bits] by 3 [bits].

Figure 38A:
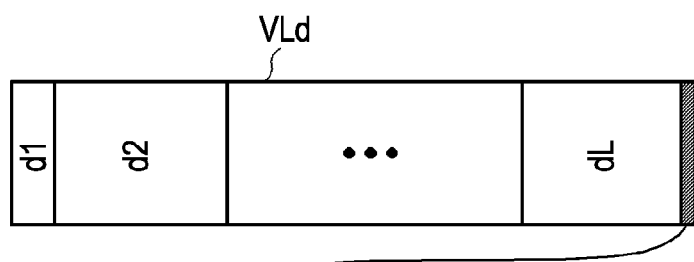
FIG. 38 is a schematic diagrammatic view provided for illustrating generation (2) of a bit stream according to the other embodiments of the present invention.
Figure 38B:
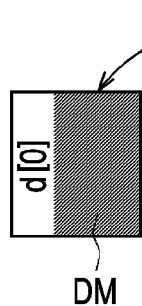
Figure 38C:
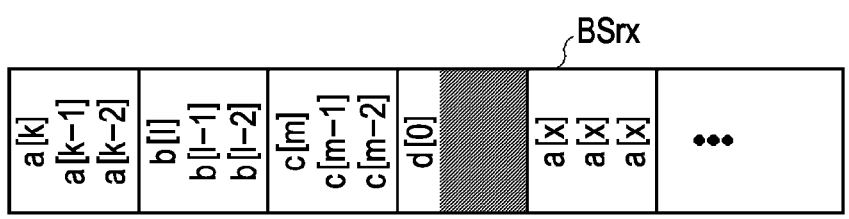

In this case, as shown in FIG. 38, the encoder adds dummy data DM to the finally remaining 1 [bit] or 2 [bits] so as to generate a set of 3 [bits], for example, when the data based on the variable length code sequence VLd is finished.

To this end, the encoder can change just the recording interval similar to the above-described second embodiment so as to generate the bit stream BSrx, without breaking the relationship of the extraction number of 3 [bits].

In the above-described second embodiment, the case where the variable length code sequences VLa to VLd having the variable length are arranged in the nested shape was described. The present invention is not limited thereto and the code length may be a fixed value by adding dummy data next to the variable length code sequences VLa to VLd. In this case, the above-described termination process (re-execution of the decoded data generating process) is unnecessary.

In the above-described first to third embodiments, the case where the image data indicating the pixel value without modification is received was described. The present invention is not limited thereto and, for example, image data which is subjected to a DCT process or a quantization process may be received. The image data is not necessarily a 4:2:2 format, and, for example, a 4:2:0 format or a 4:4:4 format may be used.

Figure 39:
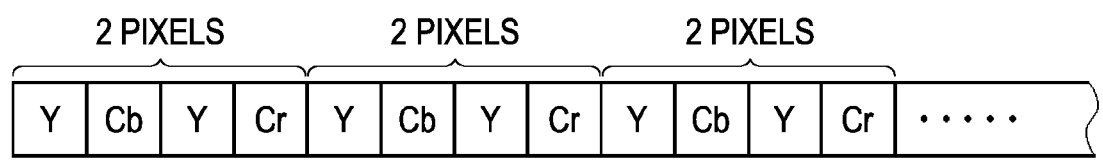
FIG. 39 is a schematic diagrammatic view provided for illustrating image data according to the other embodiments of the present invention.

In the above-described first to third embodiments, the case where the image data BL is formed of the block of the luminance data and the block of the color difference data corresponding to a predetermined number of pixels was described. The present invention is not limited thereto and, for example, as shown in FIG. 39, the luminance data and the color difference data may be composed of a set of 2 pixels. In this case, a block corresponding to a certain number of pixels may be separated as the data block DB.

In the above-described first to third embodiments, the case where data corresponding to the same number of pixels (that is, the same code amount) is separated as the data block DB was described. The present invention is not limited thereto and data corresponding to different number of pixels may be separated as the data block DB. In addition, the size of the data block DB is not limited.

Figure 40:
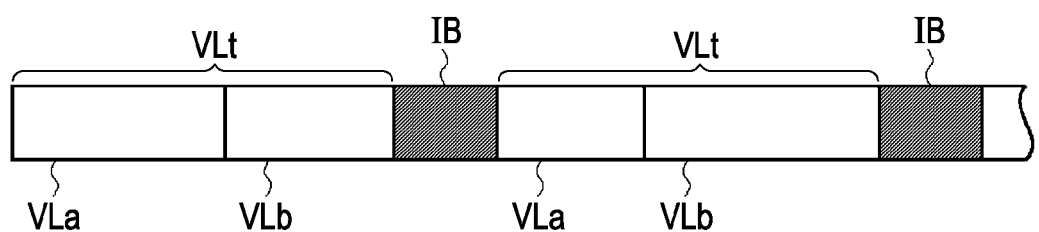
FIG. 40 is a schematic diagrammatic view provided for illustrating generation (3) of a bit stream according to the other embodiments of the present invention.

In the above-described first embodiment, the case where the boundary between the code length fixed blocks VLx can be recognized from the code length by generating the code length fixed blocks VLx was described. The present invention is not limited thereto and, for example, as shown in FIG. 40, code blocks VLt having a variable code length may be generated and boundary information IB may be inserted between the code blocks VLt such that the boundary between the code blocks VLt is recognized. In this case, by consecutively variable-length-encoding one data block, the code blocks VLt obtained by combining two variable length code sequences VLa and VLb to be variable-length-decoded by different variable length decoding units can be generated.

To this end, in the present invention, since the buffer data DD may not be included in order to generate the code length fixed blocks VLx, it is possible to reduce the overall code amount if the data amount of the boundary information IB is smaller than that of the buffer data DD. The present invention is efficiently applicable to image data which is subjected to a DCT process such that the code amount is significantly changed.

Instead of the variable length code sequences VLa and VLb, the nested block BLy of the second embodiment may be used. In this case, the nested block Bly used in the second half is subjected to mirror processing, instead of the variable length code sequence VLb.

In the above-described first embodiment, the case where one code length fixed block VLx is variable-length-decoded from both ends thereof in parallel was described. The present invention is not limited thereto, and the start end and the termination end of a next code length fixed block VLx are specified from the code length of the code length fixed block VLx and a plurality of code length fixed blocks VLx may be variable-length-decoded.

In the above-described first embodiment, the case where the first half variable length code sequence VLa and the second half variable length code sequence VLb are generated such that the respective lengths thereof become equal to or less than a predetermined code length was described. The present invention is not limited thereto, and the first half variable length code sequence VLa and the second half variable length code sequence VLb are generated such that the additional value thereof becomes equal to or less than a predetermined code length.

In the above-described first to third embodiments, the case where each of decoding units has a 16-bit buffer memory was described. The present invention is not limited thereto, and a buffer memory is mounted according to a maximum code length of variable-length-encoded data, and the number of bits is not limited in storage capacity equal to or more than the maximum code length of the variable-length-encoded data.

In the above-described first to third embodiments, the case where the variable length decoding unit reads the bits to be decoded from the start pointer by a predetermined number was described. The present invention is not limited thereto and only data used for decoding may be read from the memory by performing shift control of the buffer memory.

In the above-described first and third embodiments, the case where the second half variable length code sequence is coupled to the first half variable length code sequence after being subjected to mirror processing was described. The present invention is not limited thereto, and, for example, the variable length decoding unit may have a memory and reading may be performed from the termination end portion in the reverse direction when the variable length encoding of the variable length code sequence is finished. To this end, the mirror processing unit is unnecessary.

In the above-described first to third embodiments, the case where the encoding program, the decoding program and the like are stored in a ROM, a hard disk drive or the like in advance was described, the present invention is not limited thereto and the program may be installed from an external storage medium such as a memory stick (registered trademark of Sony Corporation) in a flash memory or the like. In addition, a database generating program or the like may be externally acquired via a Universal Serial Bus (USB) or wireless Local Area Network (LAN) such as Ethernet (registered trademark) (Institute of Electrical and Electronics Engineers: registered trademark) 802.11a/b/g and may be distributed a terrestrial digital television broadcast or a BS digital television broadcast.

The above-described first to third embodiment may be properly combined.

In the above-described first embodiment, the case where the encoder 10 is configured as an encoder by the separation unit 12 as a separation unit, the variable length encoding unit 13 as a variable length encoding unit, and the bit stream generating unit 14 as a code block generating unit and a bit stream generating unit was described. The present invention is not limited thereto and the encoder of the present invention may be configured by a separation unit, a variable length encoding unit, a code block generating unit and a bit stream generation unit having various other configurations.

In the above-described first embodiment, the case where the decoder 30 is configured as a decoder by the memory 32 as a receiving unit, the reading control unit 32 as a specifying unit and the parallel decoding unit 40 as a parallel decoding unit was described. The present invention is not limited thereto and the decoder of the present invention may be configured by a receiving unit, a specifying unit and a parallel decoding unit having various other configurations.

The present application contains subject matter related to that disclosed in Japanese Priority Patent Application JP 2008-330208 filed in the Japan Patent Office on Dec. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An encoder comprising:
   a separation unit to separate image data into a plurality of data blocks;
   a variable length encoding unit to variable-length-encode the data blocks separated by the separation unit so as to generate variable length code sequences;
   a code block generating unit to generate code blocks by combining two variable-length code sequences generated by the variable length encoding unit to enable variable-length-decoding in parallel from a start end and a termination end; and
   a bit stream generating unit to generate a bit stream such that a boundary between the code blocks is recognized.

2. The encoder according to claim 1, wherein:
   the code block generating unit sets code lengths of the code blocks to a fixed length, and
   the bit stream generating unit generates the bit stream such that the boundary between the code blocks is recognized by arranging the code blocks.

3. The encoder according to claim 2, wherein the code block generating unit generates the code blocks by inserting buffer data between the two variable-length code sequences so as to fix the code lengths.

4. The encoder according to claim 3, wherein the variable length encoding unit generates the two variable-length code sequences such that a sum of the code lengths of the two variable-length code sequences becomes equal to or less than the fixed length.

5. The encoder according to claim 3, wherein the bit stream generating unit generates the code blocks, by arranging variable length codes arranged in a first half of the two variable length code sequences from the start end in a normal direction and arranging variable length codes arranged in a second half thereof from the termination end in a reverse direction.

6. The encoder according to claim 1, wherein:
   the code block generating unit generates the code blocks having a variable code length, and
   the bit stream generating unit generates the bit stream such that the boundary between the code blocks is recognized by inserting boundary information between the code blocks.

7. The encoder according to claim 2, wherein the bit stream generating unit arranges data based on the plurality of code blocks in a nested shape.

8. The encoder according to claim 1, wherein the bit stream generating unit arranges data based on the plurality of code blocks 1 bit by 1 bit in a nested shape.

9. An encoding method comprising:
   separating image data into a plurality of data blocks;
   variable-length-encoding the data blocks so as to generate variable-length code sequences;
   generating code blocks by combining two variable-length code sequences to enable variable-length-decoding in parallel from a start end and a termination end; and
   generating a bit stream such that a boundary between the code blocks is recognized.

10. A non-transitory computer-readable medium having an encoding program recorded thereon that, when executed by a computer, cause the computer to execute acts of:
    separating image data into a plurality of data blocks;
    variable-length-encoding the data blocks so as to generate variable-length code sequences;
    generating code blocks by combining two variable-length code sequences to enable variable-length-decoding in parallel from a start end and a termination end; and
    generating a bit stream such that a boundary between the code blocks is recognized.

* * * * *